US011184663B2

(12) United States Patent
Ade et al.

(10) Patent No.: US 11,184,663 B2
(45) Date of Patent: Nov. 23, 2021

(54) PLATFORM FOR PUBLISHING GRAPHICS TO AIR

(71) Applicant: Turner Broadcasting System, Inc., Atlanta, GA (US)

(72) Inventors: Martin Ade, Atlanta, GA (US); Simon Coffin, Decatur, GA (US); David Denton, Buford, GA (US); Emanuel Paralescu, Suwanee, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 15/925,117

(22) Filed: Mar. 19, 2018

(65) Prior Publication Data

US 2018/0288496 A1    Oct. 4, 2018

Related U.S. Application Data

(63) Continuation of application No. 15/924,807, filed on Mar. 19, 2018.
(Continued)

(51) Int. Cl.
*G06T 11/60* (2006.01)
*G06F 16/16* (2019.01)
(Continued)

(52) U.S. Cl.
CPC ....... *H04N 21/4312* (2013.01); *G06F 3/0482* (2013.01); *G06F 16/168* (2019.01);
(Continued)

(58) Field of Classification Search
CPC ............ G06F 3/0482; G06F 17/30126; G06F 17/212; G06F 17/30017; G06F 17/30244;
(Continued)

(56) References Cited

U.S. PATENT DOCUMENTS 8,400,436 B1    3/2013 Kuck et al.
9,027,064 B1 *  5/2015 Opare-Abetia ...... H04N 21/238
                                                725/115
(Continued)

OTHER PUBLICATIONS

United States Patent and Trademark Office, Office Action for U.S. Appl. No. 15/925,068, dated Aug. 29, 2018, 24 pages, U.S.A.
(Continued)

*Primary Examiner* — Jin Cheng Wang
(74) *Attorney, Agent, or Firm* — Alston & Bird LLP

(57) ABSTRACT

A graphics building interface for generating a digital graphic is provided to be displayed by and interacted with via a user computing entity. A graphics object is generated. The graphics object is a data structure comprising predetermined fields and predetermined structure information. User input selecting a first selectable option is received. The user input is received via the graphics building interface. At least one pathname corresponding to the first selectable option is identified. The graphics object is updated based on the at least one pathname and the first selectable option. The updated of the graphics object comprises updating two or more fields of the predetermined set of fields. One of the fields is updated at least in part by populating the field with the pathname. The pathname indicates a file, a location within the file, or both where a content item corresponding to the first selectable option is stored.

20 Claims, 19 Drawing Sheets

Related U.S. Application Data

(60) Provisional application No. 62/477,571, filed on Mar. 28, 2017.

(51) Int. Cl.

| | | |
|---|---|---|
| *G06F 3/0482* | (2013.01) | |
| *G06F 40/106* | (2020.01) | |
| *G06F 40/109* | (2020.01) | |
| *H04N 21/431* | (2011.01) | |
| *H04N 21/2187* | (2011.01) | |
| *H04N 21/44* | (2011.01) | |
| *H04N 21/854* | (2011.01) | |
| *H04N 5/222* | (2006.01) | |
| *H04N 21/234* | (2011.01) | |
| *H04L 29/06* | (2006.01) | |
| *H04N 21/81* | (2011.01) | |

(52) U.S. Cl.
CPC .......... *G06F 40/106* (2020.01); *G06F 40/109* (2020.01); *G06T 11/60* (2013.01); *H04L 65/4076* (2013.01); *H04L 65/4084* (2013.01); *H04L 65/607* (2013.01); *H04N 21/2187* (2013.01); *H04N 21/44* (2013.01); *H04N 21/8133* (2013.01); *H04N 21/8153* (2013.01); *H04N 21/85406* (2013.01); *H04N 5/222* (2013.01)

(58) Field of Classification Search
CPC ......... G06F 17/30781; G06F 17/30873; G06F 17/3089; G06F 17/30899; H04L 65/607; H04L 67/02; H04L 67/10; H04L 67/1097; H04L 67/26; H04L 67/2852; H04L 67/32; H04N 21/2187; H04N 21/8133; H04N 21/44; H04N 21/4312
USPC ....................................................... 345/629
See application file for complete search history.

(56) References Cited

U.S. PATENT DOCUMENTS

| | | | |
|---|---|---|---|
| 9,998,796 B1* | 6/2018 | Kedenburg, III | H04N 21/482 |
| 2007/0233738 A1 | 10/2007 | Weinberger et al. | |
| 2008/0263591 A1 | 10/2008 | de Heer | |
| 2009/0249222 A1* | 10/2009 | Schmidt | H04N 21/2368 715/751 |
| 2010/0123830 A1 | 5/2010 | Vunic | |
| 2010/0153829 A1* | 6/2010 | Gopal | G06F 7/724 714/808 |
| 2011/0034261 A1* | 2/2011 | Kawaguchi | H04L 67/38 473/54 |
| 2012/0185772 A1* | 7/2012 | Kotelly | G11B 27/034 715/719 |
| 2012/0219271 A1 | 8/2012 | Vunic et al. | |
| 2013/0147913 A1 | 6/2013 | Stiner et al. | |
| 2013/0222418 A1* | 8/2013 | Campbell | G06F 3/14 345/629 |
| 2013/0339807 A1 | 12/2013 | Umeroglu et al. | |
| 2016/0059135 A1 | 3/2016 | Wright et al. | |
| 2016/0071544 A1 | 3/2016 | Waterston et al. | |
| 2016/0103912 A1 | 4/2016 | Daggett et al. | |
| 2016/0198200 A1* | 7/2016 | Choi | H04N 21/4394 725/19 |
| 2016/0255406 A1* | 9/2016 | Soh | H04N 21/47214 725/32 |
| 2016/0261927 A1* | 9/2016 | Smolic | H04N 21/4722 |
| 2016/0261929 A1* | 9/2016 | Lee | H04N 21/84 |
| 2016/0350730 A1* | 12/2016 | Greenberg | G06Q 20/10 |
| 2016/0353169 A1* | 12/2016 | Miller | G06F 3/0482 |
| 2017/0062009 A1 | 3/2017 | Clifton et al. | |
| 2017/0169853 A1 | 6/2017 | Hu et al. | |
| 2017/0272830 A1 | 9/2017 | Richman et al. | |
| 2017/0326459 A1* | 11/2017 | Ong | A63F 13/30 |
| 2017/0339229 A1* | 11/2017 | Miller | H04L 67/26 |
| 2018/0060294 A1 | 3/2018 | Fauchére et al. | |
| 2018/0146217 A1* | 5/2018 | Kedenburg, III | H04N 21/2187 |
| 2018/0330574 A1 | 11/2018 | Wright et al. | |
| 2019/0090002 A1 | 3/2019 | Ramadorai et al. | |

OTHER PUBLICATIONS

United States Patent and Trademark Office, Office Action for U.S. Appl. No. 15/924,807, dated Sep. 7, 2018, 32 pages, U.S.A.
United States Patent and Trademark Office, NonFinal Office Action for U.S. Appl. No. 15/925,068, dated Aug. 7, 2019, (50 pages), USA.
United States Patent and Trademark Office, Final Office Action for U.S. Appl. No. 15/925,106, dated Aug. 12, 2019, (45 pages), USA.
United States Patent and Trademark Office, NonFinal Office Action for U.S. Appl. No. 15/924,807, dated Aug. 22, 2019, (66 pages), USA.
Office Action for U.S. Appl. No. 15/925,106, dated Mar. 8, 2019, 31 pages.
United States Patent and Trademark Office, NonFinal Office Action for U.S. Appl. No. 15/925,106, dated Apr. 16, 2020, (50 pages), USA.
United States Patent and Trademark Office, Final Office Action for U.S. Appl. No. 15/925,068, dated Feb. 20, 2020, (39 pages) USA.
United States Patent and Trademark Office, Final Office Action for U.S. Appl. No. 15/924,807, dated Feb. 27, 2020, (78 pages), USA.
United States Patent and Trademark Office, NonFinal Office Action for U.S. Appl. No. 15/925,068, dated Sep. 16, 2020, (43 pages), USA.
United States Patent and Trademark Office, Final Office Action for U.S. Appl. No. 15/925,106, dated Sep. 30, 2020, (57 pages), USA.
United States Patent and Trademark Office, NonFinal Office Action for U.S. Appl. No. 15/924,807, dated Oct. 2, 2020, (62 pages), USA.
United States Patent and Trademark Office, Final Office Action for U.S. Appl. No. 15/924,807, dated Apr. 7, 2021, (58 pages), USA.

\* cited by examiner

PLATFORM FOR PUBLISHING GRAPHICS TO AIR

CROSS-REFERENCE TO RELATED APPLICATIONS

This application is a continuation of U.S. patent application Ser. No. 15/924,807, filed Mar. 19, 2018, which claims priority to U.S. Patent Application Ser. No. 62/477,571, filed on Mar. 28, 2017, which is hereby incorporated herein in its entirety by reference.

FIELD

Various example embodiments relate to publishing graphics to air as part of a media event. An example embodiment relates to publishing graphics to air as part of a live media event. An example embodiment relates to generating graphics to be aired as part of a live media event before the beginning of the media event.

BACKGROUND

Traditionally, when producing a media production, a producer or editor relies on a specialized graphics operator to create screen graphics for broadcasting as part of the media production. Shortcomings of this process may be especially apparent during production of a live media production, such as a live sporting event and/or the like. For example, the specialized graphics operator would need to create sporting event appropriate graphics (e.g., with the correct team colors and/or logo) with current statistics for the sporting event in real time during the live production by identifying the pathname, file name, file path, and/or the like (referred to as a pathname herein) for the various graphic elements, correctly typing real time and/or near real time statistics, and/or the like. This process is inefficient and can lead to errors in the graphics played live to air.

Therefore, a need exists for improved methods, apparatus, systems, computer program products, computing devices, computing entities, and/or the like for producing, generating, publishing, and/or rendering graphics for broadcasting as part of a media production.

BRIEF SUMMARY OF SOME EXAMPLE EMBODIMENTS

Various example embodiments provide systems, methods, computing entities, apparatuses, computer program products and/or the like for providing a user-friendly graphics building interface (GBI) and corresponding graphics building platform for quickly and efficiently generating graphics to be aired as part of a media event. Various example embodiments provide systems, methods, computing entities, apparatuses, computer program products and/or the like for providing a user-friendly GBI and corresponding graphics building platform for quickly and efficiently generating graphics to be aired as part of a live media event before the live media event starts and/or during the live media event. For example, in various embodiments, user selection of a template may cause the generation of a graphics object encoding a graphic having predetermined structural information/data and a predetermined set of fields. In an example embodiment, the fields may be text fields or content fields. In an example embodiment, the content fields may comprise pathnames and/or file paths to one or more content items. The content items may comprise graphical content (e.g., logos, photographs, images, and/or the like) and non-graphical content (e.g., statistics, background information/data, and/or the like). Further, user selection of a single user-selection may cause two or more fields of the graphic object to be populated. For example, the two or more fields may be populated with text, a pathname and/or file path identifying a file and/or a location within the file storing a content item, and/or the like. Various embodiments allow a user to generate one or more graphics prior to the beginning of a media event and export the graphics to a file that is moderately-sized (e.g., flat file). For example, one or more graphics may be exported to a single file that is in the kilobyte size range rather than the Megabyte size range. The moderately-sized file may then be emailed and/or otherwise transmitted to one or more other users. The pre-generated graphic may then be rendered, published, and/or the like based on the moderately-sized file, in an example embodiment. In an example embodiment, when the pre-generated graphics are rendered, published, and/or the like based on the moderately-sized file, it may be determined if the content items referenced by the pathnames and/or file paths in the moderately-sized file are the most current version of those content items. In an example embodiment, if one or more of the content items have been updated since the generation of the moderately-sized file, the graphic may be automatically rendered, published, and/or the like with the current version of the content item. For example, the pre-generated graphic may be rendered, published, and/or the like with real time and/or near real time accurate statistics, logos, and/or other content items.

According to an aspect of the present invention, a method for generating a digital graphic is provided. In an example embodiment, the method comprises providing a graphics building interface to be displayed by and interacted with via a user computing entity; generating a graphics object, the graphics object being a data structure comprising a predetermined set of fields and predetermined structure information; receiving an indication of user input selecting a first selectable option from a plurality of selectable options, the user input received via the graphics building interface; identifying at least one pathname corresponding to the first selectable option; and updating the graphics object based on the at least one pathname and the first selectable option. The updating of the graphics object comprises updating two or more fields of the predetermined set of fields. At least one of the two or more fields is populated with the at least one pathname. The at least one pathname indicates one of (a) a file, (b) a location within the file, or (c) both where a content item corresponding to the first selectable option is stored.

According to another aspect of the present invention, an apparatus for generating a digital graphic is provided. In an example embodiment, the apparatus comprises at least one processor, a network interface configured to communicate via at least one network, and a memory storing computer-executable code portions. The computer-executable code portions are configured to, when executed by the at least one processor, cause the apparatus to at least cause a graphics building interface to be displayed by a user computing entity and configured for user interaction via the user computing entity; generate a graphics object, the graphics object being a data structure comprising a predetermined set of fields and predetermined structure information; receive an indication of user input selecting a first selectable option from a plurality of selectable options, the user input received via the graphics building interface; identify at least one pathname corresponding to the first selectable option; and update the graphics object based on the at least one pathname and the first selectable option. The updating of the graphics object comprises updating two or more fields of the predetermined set of fields. At least one of the two or more fields is populated with the at least one pathname. The at least one pathname indicates one of (a) a file, (b) a location within the file, or (c) both where a content item corresponding to the first selectable option is stored.

According to yet another aspect of the present invention, a computer program product for generating a digital graphic is provided. In an example embodiment, the computer program product comprises at least one non-transitory computer-readable storage medium having computer-executable program code instructions stored therein. The computer-executable program code instructions comprising program code instructions configured to cause a graphics building interface to be displayed by a user computing entity and configured for user interaction via the user computing entity; generate a graphics object, the graphics object being a data structure comprising a predetermined set of fields and predetermined structure information; receive an indication of user input selecting a first selectable option from a plurality of selectable options, the user input received via the graphics building interface; identify at least one pathname corresponding to the first selectable option; and update the graphics object based on the at least one pathname and the first selectable option. The updating of the graphics object comprises updating two or more fields of the predetermined set of fields. At least one of the two or more fields is populated with the at least one pathname. The at least one pathname indicates one of (a) a file, (b) a location within the file, or (c) both where a content item corresponding to the first selectable option is stored.

According to still another aspect of the present invention, a method for generating a graphic is provided. In an example embodiment, the method comprises providing a graphics building interface to be displayed by and interacted with via a user computing entity; and receiving user input selecting a template from a plurality of templates. The template comprises a predetermined set of fields and predetermined graphics structure information and the user input is received via the graphics building interface. The method further comprises receiving user input selecting a graphic context. The graphic context comprises predetermined style information and the user input received via the graphics building interface. The method further comprises generating a graphics object comprising the predetermined set of fields, the predetermined graphics structure information, and the predetermined style information based on the selected graphic context and the selected template; and updating the graphics building interface to provide one or more content selectors based on the predetermined set of fields.

According to another aspect of the present invention, an apparatus for generating a digital graphic is provided. In an example embodiment, the apparatus comprises at least one processor, a network interface configured to communicate via at least one network, and a memory storing computer-executable code portions. The computer-executable code portions are configured to, when executed by the at least one processor, cause the apparatus to at least cause a graphics building interface to be displayed by a user computing entity and configured for user interaction via the user computing entity and receive an indication of user input selecting a template from a plurality of templates. The template comprising a predetermined set of fields and predetermined graphics structure information and the user input received via the graphics building interface. The computer-executable code portions are further configured to, when executed by the at least one processor, configured to cause the apparatus to at least receive an indication of user input selecting a graphic context. The graphic context comprising predetermined style information and the user input received via the graphics building interface. The computer-executable code portions are further configured to, when executed by the at least one processor, configured to cause the apparatus to at least generate a graphics object comprising the predetermined set of fields, the predetermined graphics structure information, and the predetermined style information based on the selected graphic context and the selected template; and cause the graphics building interface to be updated to provide one or more content selectors based on the predetermined set of fields.

According to yet another aspect of the present invention, a computer program product for generating a digital graphic is provided. In an example embodiment, the computer program product comprises at least one non-transitory computer-readable storage medium having computer-executable program code instructions stored therein. The computer-executable program code instructions comprise program code instructions configured to cause a graphics building interface to be displayed by a user computing entity and configured for user interaction via the user computing entity and receive an indication of user input selecting a template from a plurality of templates. The template comprising a predetermined set of fields and predetermined graphics structure information and the user input received via the graphics building interface. The computer-executable program code instructions further comprise program code instructions configured to receive an indication of user input selecting a graphic context. The graphic context comprising predetermined style information and the user input received via the graphics building interface. The computer-executable program code instructions further comprise program code instructions configured to generate a graphics object comprising the predetermined set of fields, the predetermined graphics structure information, and the predetermined style information based on the selected graphic context and the selected template; and cause the graphics building interface to be updated to provide one or more content selectors based on the predetermined set of fields.

According to still another aspect of the present invention, a method preparing a graphic to be aired as part of a media production prior to the beginning of the media production is provided. In an example embodiment, the method comprises generating, by a user apparatus comprising a processor, a memory, and a user interface, a graphic object encoding the graphic based on user input received via a graphics building interface provided via the user interface. The graphic object comprises at least one pathname indicating one of (a) a file, (b) a location within the file, or (c) both where a content item of the graphic is stored in a content database stored by the memory. The method further comprises receiving, by the user apparatus, user input via the graphics building interface requesting the encoding of the graphic in a graphic document; generating, by the user apparatus, a graphic document comprising the graphic object; and storing, by the user apparatus, the graphic document in the memory. The graphic encoded in the graphic document is configured to be provided during the airing of a media production. The graphic document is generated prior to the beginning of the media production.

According to another aspect of the present invention, an apparatus for preparing a graphic to be aired as part of a media production prior to the beginning of the media production is provided. In an example embodiment, the apparatus comprises at least one processor, a network interface configured to communicate via at least one network, and a memory storing computer-executable code portions. The computer-executable code portions are configured to, when executed by the at least one processor, cause the apparatus to at least generate a graphic object encoding the graphic based on user input received via a graphics building interface provided via the user interface. The graphic object comprises at least one pathname indicating one of (a) a file, (b) a location within the file, or (c) both where a content item of the graphic is stored in a content database stored by the memory. The computer-executable code portions are further configured to, when executed by the at least one processor, cause the apparatus to at least receive user input via the graphics building interface requesting the encoding of the graphic in a graphic document; generate a graphic document comprising the graphic object; and store the graphic document in the memory. The graphic encoded in the graphic document is configured to be provided during the airing of a media production and the graphic document is generated prior to the beginning of the media production.

According to yet another aspect of the present invention, a computer program product for preparing a graphic to be aired as part of a media production prior to the beginning of the media production is provided. In an example embodiment, the computer program product comprises at least one non-transitory computer-readable storage medium having computer-executable program code instructions stored therein. The computer-executable program code instructions comprise program code instructions configured to generate a graphic object encoding the graphic based on user input received via a graphics building interface provided via the user interface. The graphic object comprises at least one pathname indicating one of (a) a file, (b) a location within the file, or (c) both where a content item of the graphic is stored in a content database stored by the memory. The computer-executable program code instructions further comprise program code instructions configured to receive user input via the graphics building interface requesting the encoding of the graphic in a graphic document; generate a graphic document comprising the graphic object; and store the graphic document in the memory. The graphic encoded in the graphic document is configured to be provided during the airing of a media production and the graphic document is generated prior to the beginning of the media production.

According to still another aspect of the present invention, a method for rendering a graphic based on pre-generated graphic is provided. In an example embodiment, the method comprises reading a graphic object from a graphic document comprising the graphic object. The graphic object (a) encodes the pre-generated graphic and (b) comprises (i) structure information and (ii) one or more fields corresponding to one or more content items of the pre-generated graphic. The method further comprises accessing the one or more content items from a local content database, the one or more content items referenced in the graphic object by a pathname; rendering a graphic comprising the content items corresponding to the one or more fields by arranging the one or more content items in accordance with the structure information; and causing display of the graphic via a user interface.

According to another aspect of the present invention, an apparatus for rendering a graphic based on a pre-generated graphic is provided. In an example embodiment, the apparatus comprises at least one processor, a network interface configured to communicate via at least one network, and a memory storing computer-executable code portions. The computer-executable code portions are configured to, when executed by the at least one processor, cause the apparatus to at least read a graphic object from a graphic document comprising the graphic object. The graphic object (a) encoding the pre-generated graphic and (b) comprising (i) structure information and (ii) one or more fields corresponding to one or more content items of the pre-generated graphic. The computer-executable code portions are further configured to, when executed by the at least one processor, cause the apparatus to at least access the one or more content items from a local content database, the one or more content items referenced in the graphic object by a pathname; render a graphic comprising the content items corresponding to the one or more fields by arranging the one or more content items in accordance with the structure information; and cause display of the graphic via a user interface.

According to yet another aspect of the present invention, a computer program product for rendering a graphic based on a pre-generated graphic is provided. In an example embodiment, the computer program product comprising at least one non-transitory computer-readable storage medium having computer-executable program code instructions stored therein. The computer-executable program code instructions comprise program code instructions configured to read a graphic object from a graphic document comprising the graphic object. The graphic object (a) encoding the pre-generated graphic and (b) comprising (i) structure information and (ii) one or more fields corresponding to one or more content items of the pre-generated graphic. The computer-executable program code instructions further comprise program code instructions configured to access the one or more content items from a local content database, the one or more content items referenced in the graphic object by a pathname; render a graphic comprising the content items corresponding to the one or more fields by arranging the one or more content items in accordance with the structure information; and cause display of the graphic via a user interface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 13A:
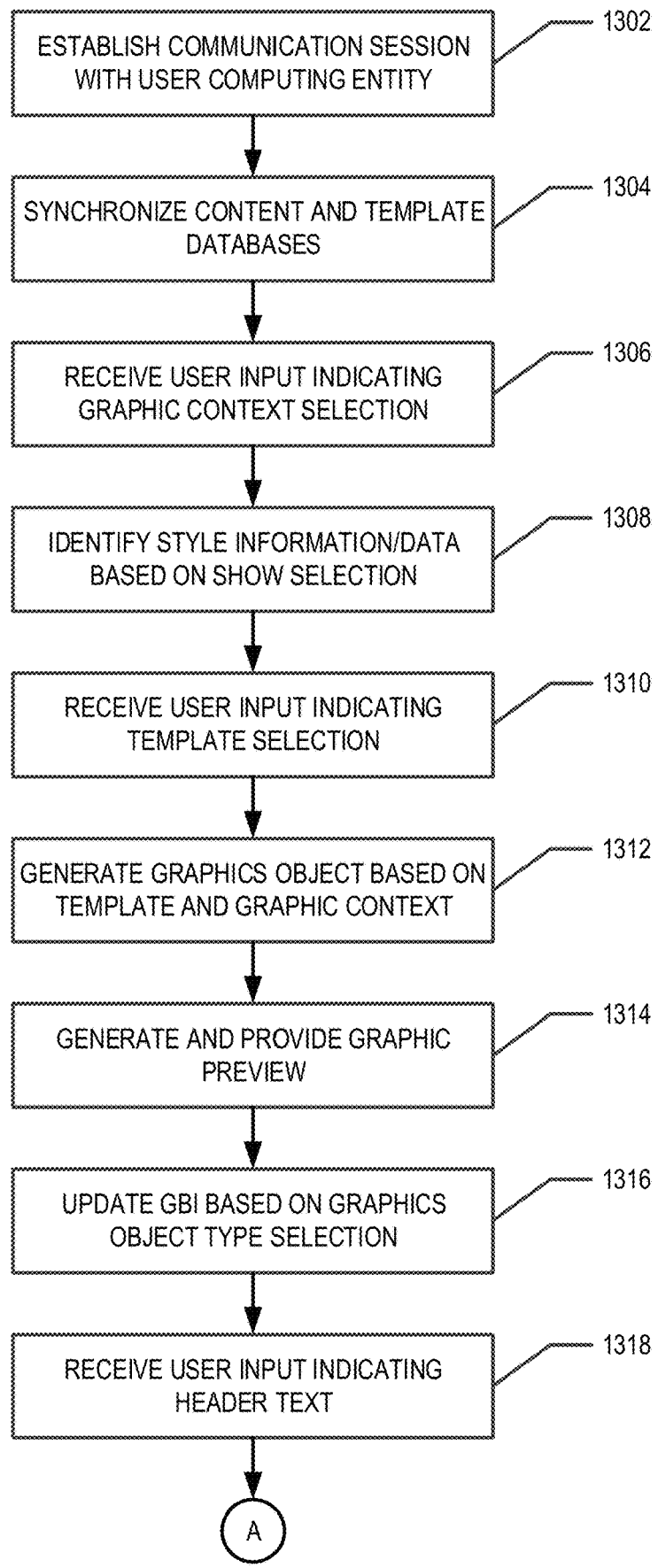
Figure 13B:
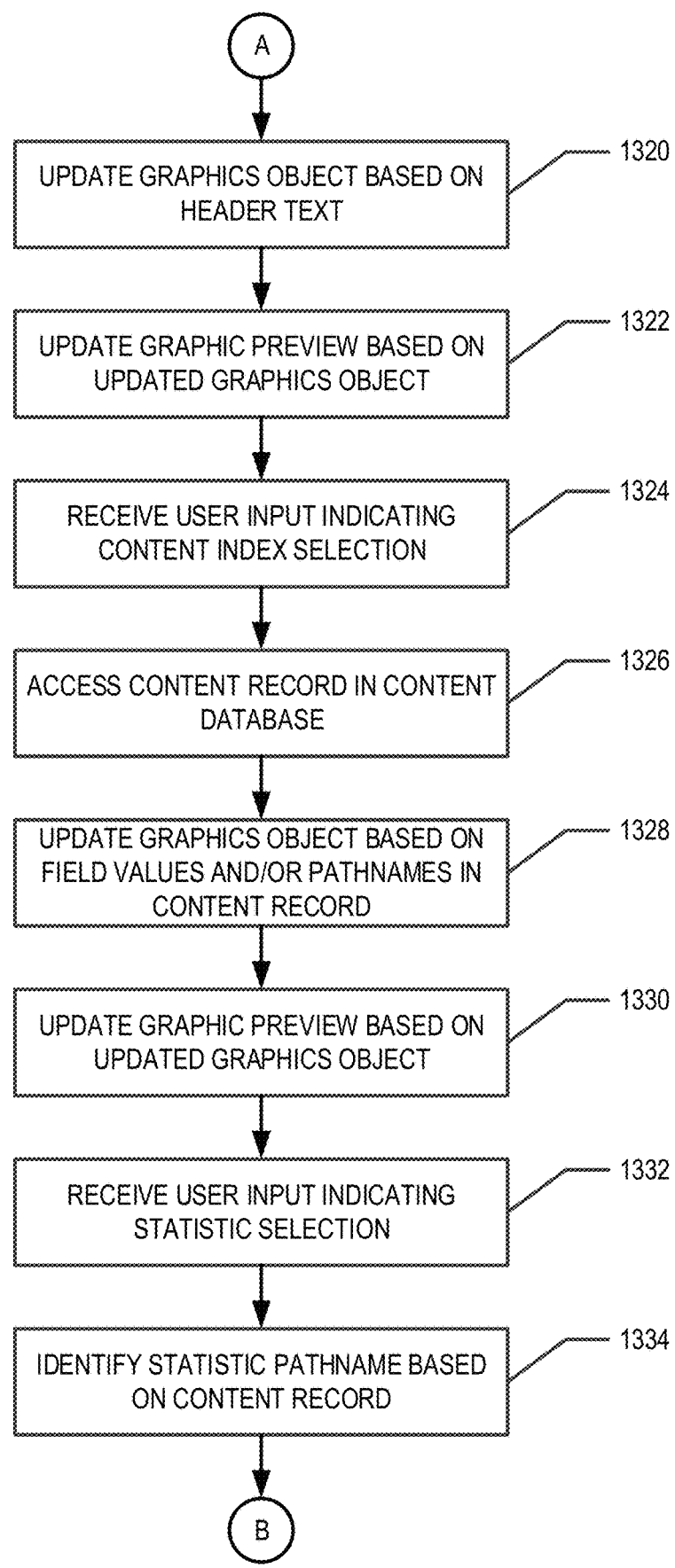
Figure 13C:
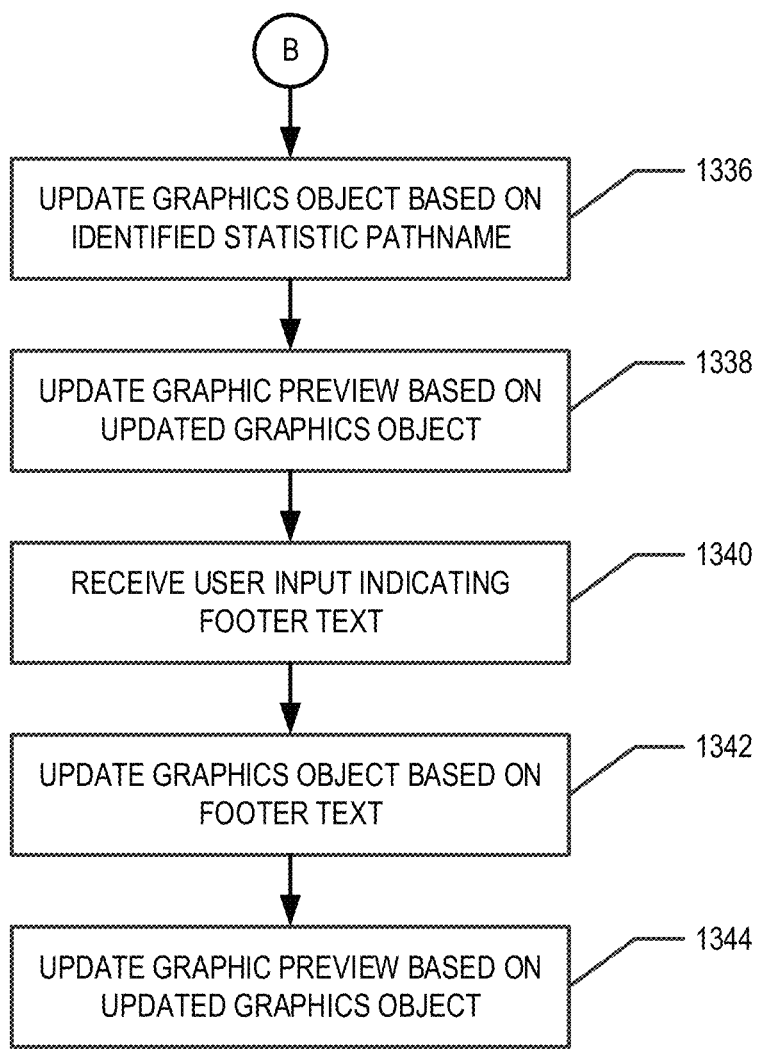
Figure 14:
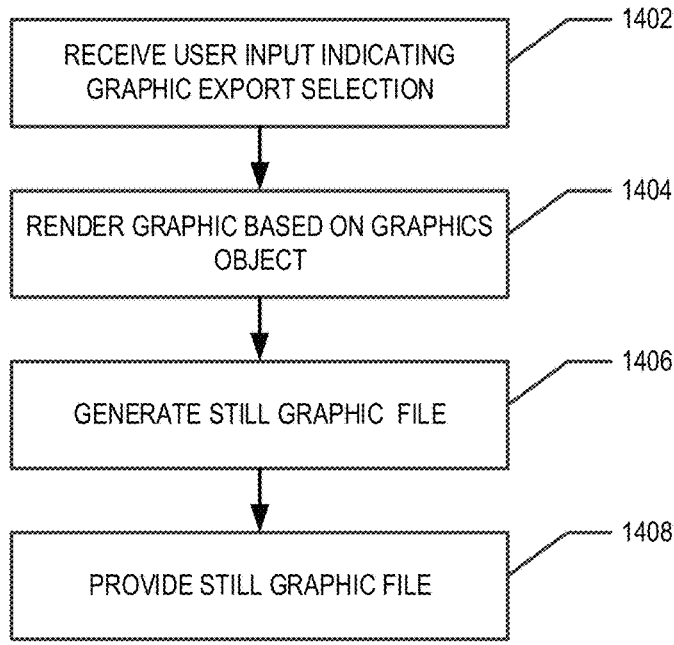
Figure 15:
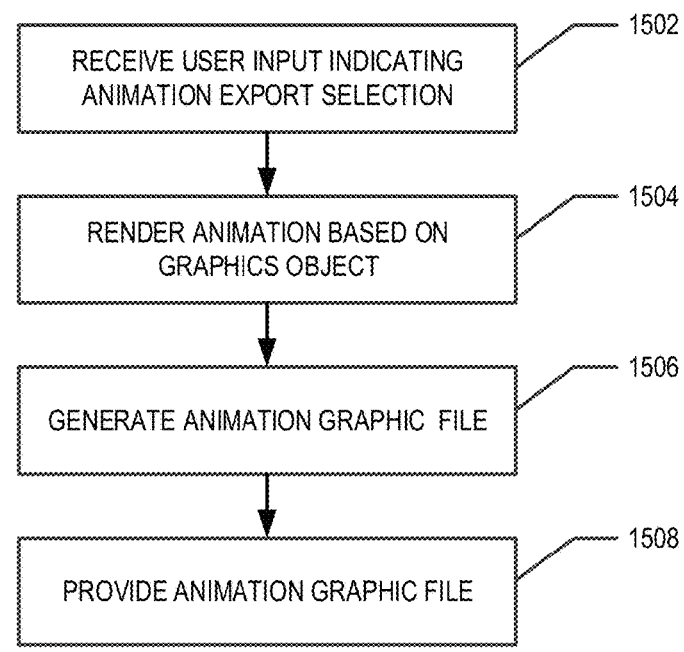
Figure 16:
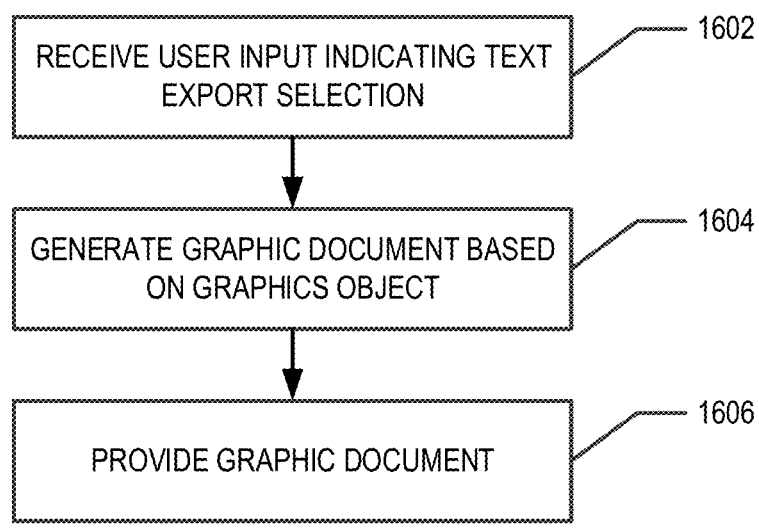
Figure 17:
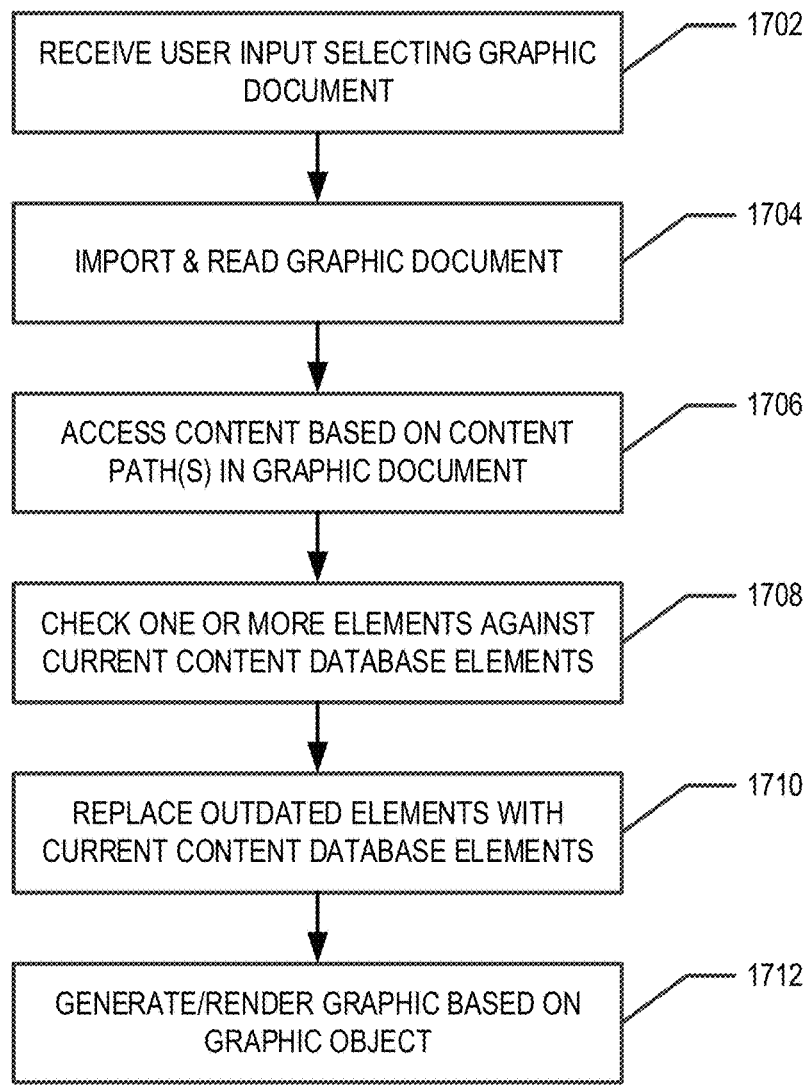
Figure 18:
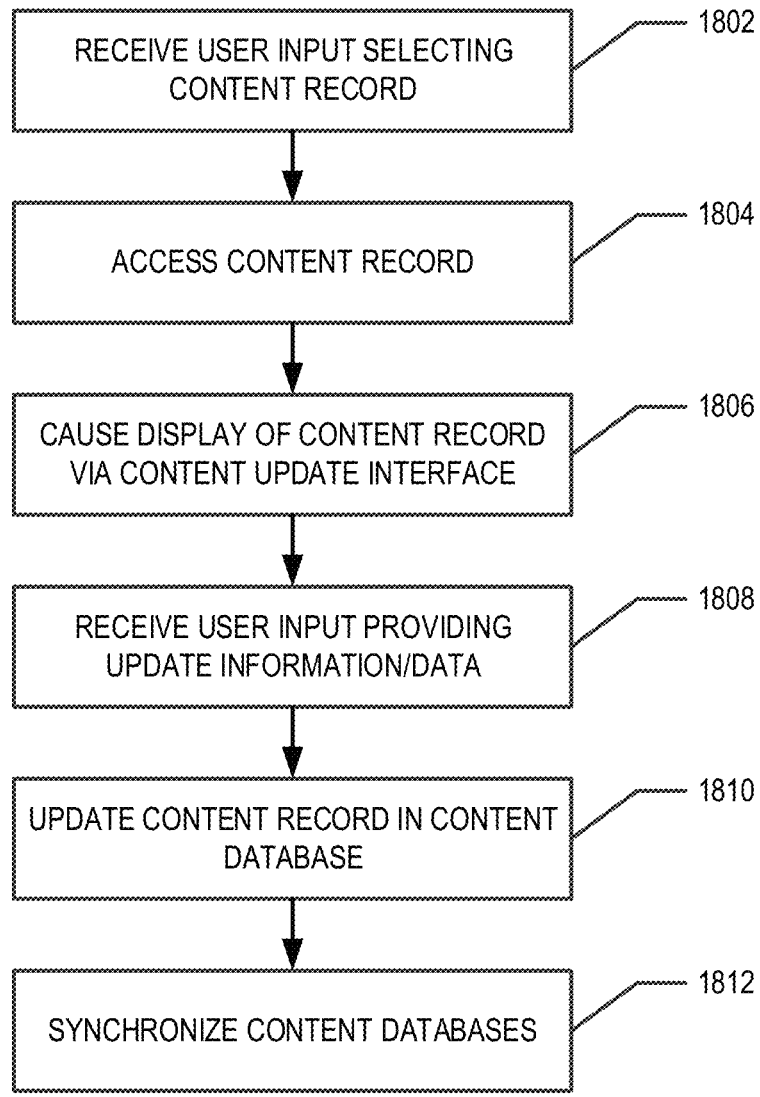

FIGS. 13A, 13B, and 13C together comprise a flowchart illustrating processes and operations related to producing, generating, and/or rendering a graphic for broadcasting as part of a media production, in accordance with one embodiment of the present invention;

FIGS. 14, 15, and 16 each provide a flowchart illustrating processes and operations related to exporting a graphic, in accordance with one embodiment of the present invention;

FIG. 17 provides a flowchart illustrating processes and operations related to rebuilding a graphic exported as a graphic document, in accordance with one embodiment of the present invention; and FIG. 18 provides a flowchart illustrating processes and operations related to updating a content database, in accordance with one embodiment of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also indicated as "/") is used herein in both the alternative and conjunctive sense, unless otherwise indicated. The terms "illustrative" and "exemplary" are used to be examples with no indication of quality level. As used herein, the term "approximately" refers to within manufacturing and/or engineering tolerances for the corresponding materials and/or elements. And terms are used both in the singular and plural forms interchangeably. Like numbers refer to like elements throughout.

I. METHODS, APPARATUS, SYSTEMS, AND COMPUTER PROGRAM PRODUCTS

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAIVI), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. GENERAL OVERVIEW

Embodiments of the present invention provide methods, apparatus, systems, computer program products, computing devices, computing entities, and/or the like for providing a platform for rendering, publishing and/or the like graphics (e.g., still graphics and/or animated graphics) to air (e.g., a media event, live media event, media production, live media production, and/or the like). For example, the platform for publishing graphics may be used to provide graphics illustrating, providing, and/or the like player statistics, background information/data, current game statistics, and/or the like during a live airing of a basketball game. In an example embodiment, the platform comprises a graphics producing module, application, and/or the like configured to provide a user of a user computing entity with a GBI. In an example embodiment, the user computing entity is remotely located with respect to the graphics computing entity executing the graphics producing module, application, and/or the like and/or the platform for publishing graphics. In an example embodiment, the GBI is an interactive graphical user interface that may be used to generate graphics live and/or in advance of filming, producing, editing, and/or the like of a media event and/or production (including live media events and/or productions).

In an example embodiment, the platform comprises a graphics rendering module, application, program, engine, and/or the like that interfaces (e.g., via an application programing interface (API)) with the graphics producing module, application, and/or the like. For example, the graphics computing entity may be configured to render still and/or animated graphics for display via various computing entities. In an example embodiment, the GBI provides a user with a plurality of user selectable templates and/or scenes, a plurality of user selectable graphics contexts and/or production skins, and a plurality of user selectable content items and/or objects. In an example embodiment, the templates and/or scenes, graphic contexts and/or production skins, and content items and/or objects may be stored in one or more databases (e.g., content database 260, template database 250, and/or the like). In an example embodiment, the content items and/or objects may comprise graphic content items and non-graphic content items. For example, the graphic content items may comprise images, photographs, drawings, renderings, logos, raw color values (e.g., in RGB values, cmyk values, and/or the like), captures of social media posts (e.g., digital image of a tweet, and/or the like), and/or other graphical elements. In an example embodiment, the non-graphic content items may comprise statistics, data (e.g., a height, position, college information/data, years in the league, teams played with, records and/or titles held, awards and/or the like for a professional basketball player, for example), and/or the like. In an example embodiment, a template and/or scene may define the structure information/data and/or the layout of a graphic, the fields available for population for generation of the graphic, and/or the like. In an example embodiment, the structure information/data may provide a dynamic layout of the graphic wherein the layout of content items within the graphic are dependent on the number of content indices, categories, statistics, and/or other information/data that the user selects. In an example embodiment, the graphic context and/or production skin may define one or more style attributes of a graphic, such as a text font, a logo, background colors, a sponsor, animation effects, and/or the like. In an example embodiment, a template/scene, a graphic context/production skin, and one or more content objects (e.g., via selection of content indices, categories, statistics and/or background information/data, and/or the like) may be selected (e.g., via the GBI) to generate a graphic. In an example embodiment, a user may enter text via the GBI to populate on or more available text fields of a graphic (e.g., graphic title, sub-title, footer, and/or the like).

In an example embodiment, a user operating a user computing entity may generate a graphic using the GBI provided via the graphical production module, application, and/or the like. The graphical production module, application, and/or the like may then generate a graphic document that encodes the graphic (e.g., a document that encodes the graphic but is moderately-sized). For example, the graphic document may be a plain text file, word file, and/or the like such that one or more graphics may be encoded into a moderately-sized (e.g., kilobyte scale) file. The graphic document may then be emailed to another user (e.g., a graphics operator) and, when opened within the graphical production module, application, and/or the like (e.g., through the GBI), may cause the automatic rendering, publishing, and/or the like of the graphic. In an example embodiment, if one or more of the template/scene, production skin, and/or content object(s) have been changed and/or updated since the graphic was generated, the graphic may be rendered, published, and/or the like using the changed and/or updated template/scene, graphic context/production skin, and/or content object(s), in an example embodiment. For example, a graphic may be generated before the beginning of a live media production. The pre-generated graphic may then be rendered, published, and/or the like live to air with real time and/or near real time accurate content objects (e.g., statistics, and/or the like) during the live media production. As will be recognized, various system architectures that may be used in accordance with the present invention will now be described herein.

III. EXEMPLARY SYSTEM ARCHITECTURE

Figure 1:
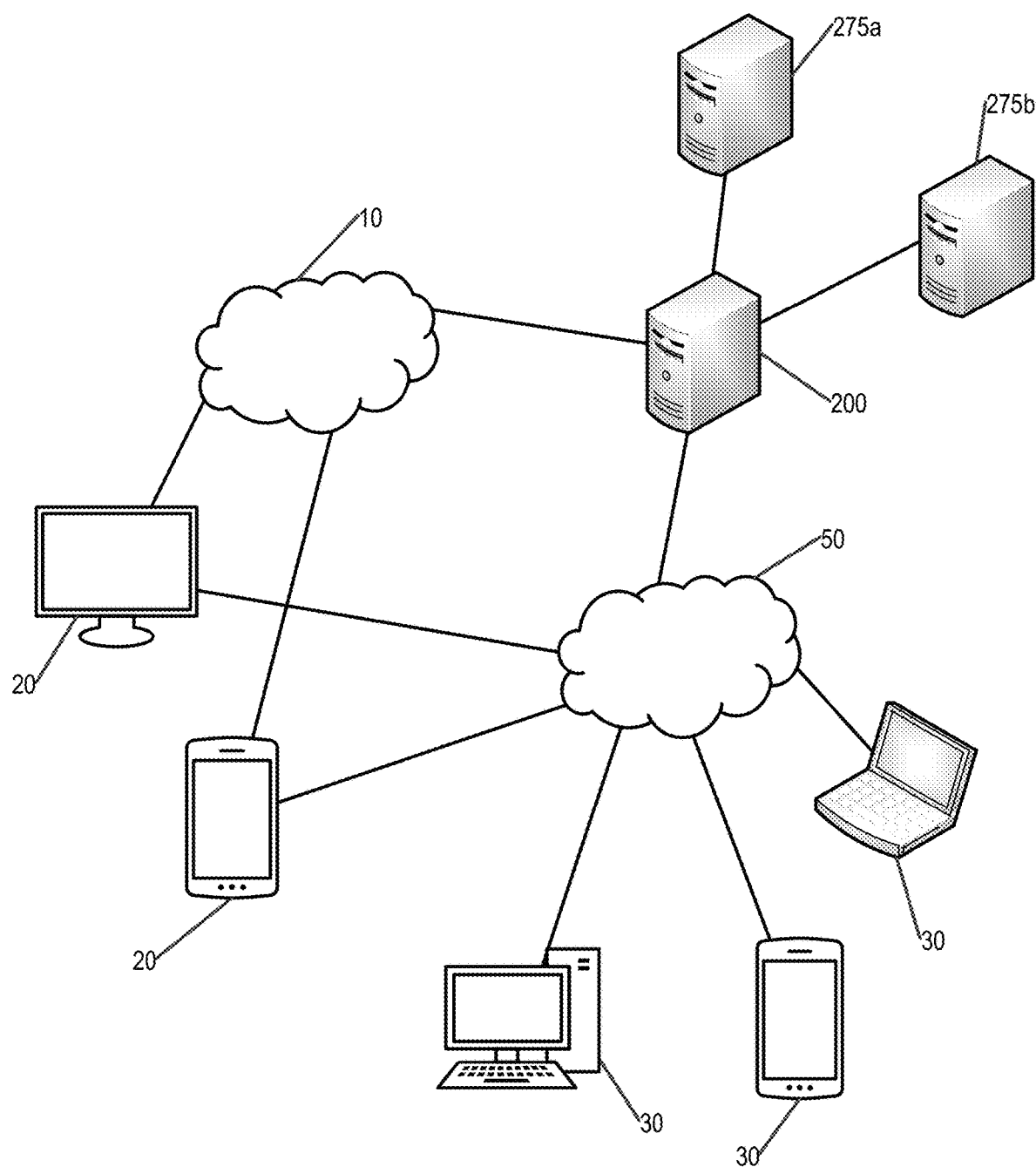
FIG. 1 illustrates one embodiment of a system for producing, generating, and/or rendering graphics for broadcasting as part of a media production, in accordance with one embodiment the present invention.

FIG. 1 illustrates one embodiment of a system that may implement the present invention. In this particular embodiment, the illustrated system may include one or more content distribution/delivery networks (CDNs) 10, one or more user computing entities 30, one or more provider networks/systems 200, one or more graphics computing entities 275, and one or more consumer devices 20. The one or more CDNs 10, the one or more user computing entities 30, one or more consumer devices 20, the one or more provider networks/systems 200, and the one or more graphics computing entities 275 may communicate with each other and/or a variety of other computing entities via one or more wired or wireless networks. In an example embodiment, the one or more graphics computing entities 275 may communicate with one or more user computing entities 30 through the provider networks/systems 200. Although described separately, it will be recognized that two or more of the above entities can be combined or included in a single platform.

Content Distribution/Delivery Networks 10

In various embodiments, the one or more CDNs 10 may comprise networks configured for distributing media content. Generally, the term "content" may refer to any type of media—audio, videos, datacasts, music, text, images, graphics, articles, photos, photo galleries, video galleries, infographics, maps, polls, guest biographies, tweets or other social media, blog posts, and/or the like. For example, content may include television broadcasts (e.g., live local newscasts), television programs (e.g., The Office), sporting events, movies (e.g., video-on-demand (VOD)), datacasts, music, images, videos, text, webpages, and/or the like. Thus, the CDN 10 may be configured for providing a user with media content via a broadcast, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

Over-the-Air Content Delivery/Distribution Network

An over-the-air (OTA) CDN 10 can be used in conjunction with embodiments of the present invention. The OTA CDN 10 may be owned and/or operated by a broadcaster (e.g., KCRG, KFXA, KFXB, KGAN, KIIN, KPXR, KRIN, KWKB, KWWF, and/or KWWL) and associated with a broadcast area (e.g., Cedar Rapids-Waterloo-Iowa City-Dubuque broadcast area). Broadcast areas may be designated market areas (DMAs), zip codes, block groups, census tracts, cartographic levels, government-established areas/zones, geographic areas, and/or the like. As will be recognized, a broadcaster may have one or more OTA CDNs 10 depending on the geographic area (e.g., DMA, zip code, block group, census tract, cartographic level, government-established area/zone, geographic area, and/or the like) the broadcast area includes.

An OTA CDN 10 may include various components to transmit/broadcast content and/or data/information via an OTA broadcast (e.g., an OTA broadcast signal) to be received by one or more distribution devices 105. In one embodiment, the OTA CDN 10 may include one or more channel coding elements, one or more modulation elements, and one or more transmitters. Although not shown, the OTA CDN 10 may also include various other components, such as audio subsystems, video subsystems, multiplexers, exciters, drivers, amplifiers, network interfaces, processing elements, and/or the like. Via these elements, for instance, the OTA CDN 10 can transmit/broadcast OTA broadcasts (comprising content and/or data) within a broadcast area. The OTA CDN 10 may transmit/broadcast the broadcast (e.g., OTA broadcast) using a variety of standards and protocols, such as Advanced Television Systems Committee (ATSC), Terrestrial Integrated Services Digital Broadcasting (ISDB-T), Terrestrial Digital Multimedia Broadcasting (T-DMB), Digital Video Broadcasting—Terrestrial (DVB-T), Digital Video Broadcasting-Handheld (DVB-H), Digital Terrestrial Multimedia Broadcast (DTMB), Satellite Terrestrial Interactive Multi-service Infrastructure (STiMi), National Television System Committee (NTSC) standards and protocols, and/or the like.

It will be appreciated that one or more of a CDN's 10 components and other broadcaster components may be located remotely from one another. Furthermore, one or more of the components may be combined and additional components performing functions described herein may be included.

Cable Content Delivery/Distribution Network

Although not shown, a cable CDN 10 (also referred to as a CDN 10) may be used with embodiments of the present invention. A cable CDN 10 may include various components to transmit/broadcast content and/or data/information via the cable provider's CDN 10 to the cable provider's subscribers. For example, in various embodiments, the cable CDN 10 may include a network operations center, a cable modem termination system, and a headend to transmit cable broadcasts (e.g., digital cable signals) through the cable provider's CDN 10 to user computing entities 30. Thus, user computing entities 30 may communicate with a headend over a distribution network.

To perform such functions, the cable CDN 10 may include various components, such as audio subsystems, video subsystems, multiplexers, switches, encoders, satellite receivers and antennae, network interfaces, decoding elements, encoding elements, processing elements, transmitting elements, modulation elements, and/or the like. The cable CDN 10 may be capable of receiving content and/or data/information and/or transmitting content and/or data/information (e.g., transmit broadcast signals in a one-to-many or broadcast configuration) using a variety of standards and protocols to user computing entities 30, including those described with regard to the OTA CDN 10 and/or further including various versions of data/information over cable service interface specification (DOCSIS).

Satellite Content Delivery/Distribution Network

Although not shown, a satellite CDN 10 (also referred to as a CDN 10) may be used with embodiments of the present invention. A satellite CDN 10 may include various components to transmit/broadcast content and/or data/information (e.g., transmit broadcast signals in a one-to-many or broadcast configuration) via the satellite provider's CDN 10 to user computing entities 30 (e.g., subscribers). For example, in various embodiments, the satellite CDN 10 may include uplink facilities (with transmitting antennae), satellites (with transponders), receiving satellite dishes, and/or user computing entities 30. Thus, the satellite CDN 10 can transmit/broadcast satellite broadcasts (comprising content and/or data) to user computing entities 30 using a variety of standards and protocols, such as those described with regard to the OTA CDN 10 and/or further including direct broadcast satellite (DBS), television receive only (TVRO), and/or the like.

IP-Based Delivery/Distribution Network

Although not shown, an IP-based CDN 10 (also referred to as a CDN 10) may be used with embodiments of the present invention. An IP-based CDN 10 may include various components to transmit/broadcast content and/or data/information (e.g., transmit broadcast signals in a one-to-many or broadcast configuration) via the provider's CDN 10 to user computing entities 30 (e.g., subscribers). Thus, the IP-based CDN 10 can transmit/broadcast broadcasts (comprising content and/or data) to user computing entities 30 using a variety of standards and protocols, such as those described previously.

Provider System 200

Herein the term "provider" is used to indicate any entity, individual, organization, company, group or the like that provides or assists in providing one or more consumers with at least one media production. A media production is a media presentation that is produced and provided via the CDN 10. For example, a media production may be a pre-produced or live, with respect to the broadcast of the media production via the CDN 10. Some example media productions include an episode of a talk show, an episode of a news show, a sporting event (e.g., a basketball game, coverage of a golf tournament, coverage of the Olympics, and/or the like), an episode of a sit-com, an episode of a mini-series, a short or full length movie, one or more episode special media presentation, and/or the like. The term "production staff" is used to indicate any individual involved with the production of at least one media production. For example, the production staff may comprise one or more producers, one or more editors, one or more graphics operators, and/or the like. The term "user" is used herein to indicate a production staff member that operates a user computing entity 30 to generate, produce, and/or render one or more graphics. The term "consumer" is used herein to indicate any individual, family, entity, organization, company, group, or the like that consumes (e.g., accesses, receives, views, and/or experiences) at least one media production provided by the provider (e.g., via a CDN 10 and/or a consumer device 20). In some embodiments, the consumer may access, receive, view, and/or experience at least one media production from the provider via a paid or unpaid subscription service for example.

In various embodiments, a provider system 200 may be configured to provide a user (e.g., operating a user computing entity 30) with an interactive user interface (e.g., a GBI) configured for generating, producing, and/or rendering one or more graphics. In various embodiments, the provider system 200 may be configured to enable, facilitate, and/or act as an intermediary between one or more user computing entities 30 and one or more graphics computing entities 275. The provider system 200 may be further configured to provide at least one media production to at least one consumer (e.g., via a consumer device 20 via a CDN 10). The media production may be in the form of a live stream of the enhanced media production or an on demand stream of the media production (e.g., Video on Demand (VOD) or the like).

In various embodiments, the provider system 200 is a system operated by, on behalf of, or in association with a media production provider to provide at least one media production to one or more consumers. In general, the terms computing entity, computer, entity, device, system, and/or similar words used herein interchangeably may refer to, for example, one or more computers, computing entities, desktops, mobile phones, tablets, phablets, notebooks, laptops, distributed systems, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the provider system 200 may also include one or more communications interfaces 296 for communicating with various computing entities, such as by communicating information/data, content, information, and/or similar terms used herein interchangeably that can be transmitted, received, operated on, processed, displayed, stored, and/or the like. For instance, the provider system 200 may communicate with user computing entities 30, graphics computing entities 275, consumer devices 20, and/or the like (e.g., via the CDN 10 and/or one or more wired or wireless networks 50).

Figure 2:
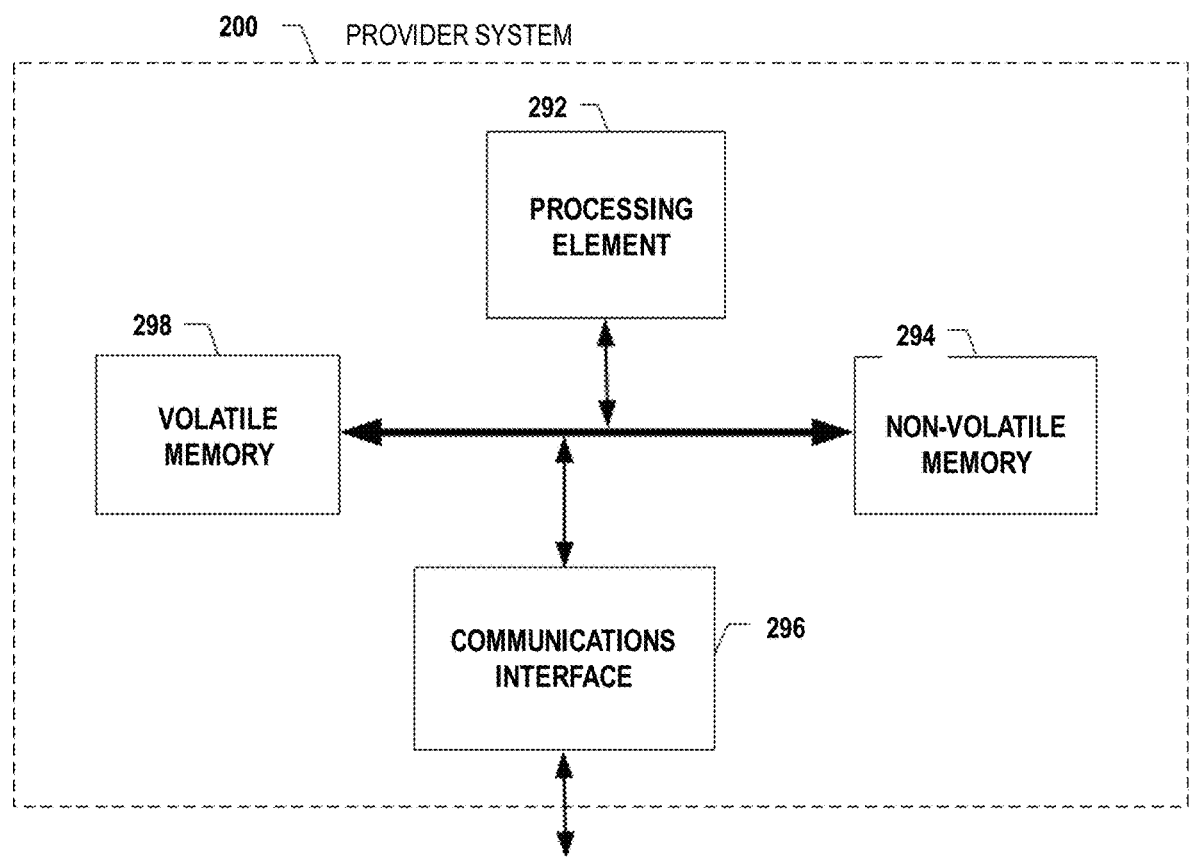
FIG. 2 is a schematic diagram of a provider system, in accordance with one embodiment of the present invention.

As shown in FIG. 2, in one embodiment, the provider system 200 may include or be in communication with one or more processing elements 292 (also referred to as processors, processing circuitry, processing device, and/or similar terms used herein interchangeably) that communicate with other elements within the provider system 200 via a bus, for example. As will be understood, the processing element 292 may be embodied in a number of different ways. For example, the processing element 292 may be embodied as one or more complex programmable logic devices (CPLDs), microprocessors, multi-core processors, coprocessing entities, application-specific instruction-set processors (ASIPs), microcontrollers, and/or controllers. Further, the processing element 292 may be embodied as one or more other processing devices or circuitry. The term circuitry may refer to an entirely hardware embodiment or a combination of hardware and computer program products. Thus, the processing element 292 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 292 may be configured for a particular use or configured to execute instructions stored in volatile or non-volatile media or otherwise accessible to the processing element 292. As such, whether configured by hardware or computer program products, or by a combination thereof, the processing element 292 may be capable of performing steps or operations according to embodiments of the present invention when configured accordingly.

In one embodiment, the provider system 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 294, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, and/or network database.

In one embodiment, the provider system 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 18, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element 292. Thus, the databases, database instances, database management systems, information/data, applications, programs, program modules, scripts, source code, object code, byte code, compiled code, interpreted code, machine code, executable instructions, and/or the like may be used to control certain aspects of the operation of the provider system 200 with the assistance of the processing element 292 and operating system.

As indicated, in one embodiment, the provider system 200 may also include one or more communications interfaces 296 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the provider system 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Bluetooth protocols, Wibree, Home Radio Frequency (HomeRF), Simple Wireless Abstract Protocol (SWAP), wireless universal serial bus (USB) protocols, and/or any other wireless protocol.

Although not shown, the provider system 200 may include or be in communication with one or more input elements, such as a keyboard input, a mouse input, a touch screen/display input, motion input, movement input, audio input, pointing device input, joystick input, keypad input, and/or the like. The provider system 200 may also include or be in communication with one or more output elements (not shown), such as audio output, video output, screen/display output, motion output, movement output, and/or the like.

As will be appreciated, one or more of the provider system's 200 components may be located remotely from other provider system 200 components, such as in a distributed system. Furthermore, one or more of the components may be combined and additional components performing functions described herein may be included in the provider system 200. Thus, the provider system 200 can be adapted to accommodate a variety of needs and circumstances. As will be recognized, these architectures and descriptions are provided for exemplary purposes only and are not limiting to the various embodiments.

Graphics Computing Entity 275

In an example embodiment, a graphics computing entity 275 is a computing entity configured and/or programmed to generate, produce, and/or render one or more graphics. The one or more graphics may comprise still and/or animated graphics. In an example embodiment, a graphics computing entity 275 may configured and/or programmed to provide one or more graphics to a provider system 200 for inclusion in a media production. For example, graphics computing entity 275 may be configured to play one or more graphics live to air. As used herein, the term "play a graphic live to air" means causing the graphic to be broadcast as part of a media production. For example, a graphics computing entity 275 may cause a score board or other player/team statistic graphic to be played live to air during a live broadcast of a sporting event. In an example embodiment, a graphics computing entity 275 may be configured to generate, produce, and/or render one or more graphics but may not be configured and/or programmed to play the graphics live to air. For example, in an example embodiment, a provider system 200 may be in communication with one or more live play-capable graphics computing entities 275A that may be used to produce, generate, and/or render one or more graphics during a production and/or broadcasting of a live media production and one or more preparation graphics computing entities 275B that may be used to produce, generate, and/or render one or more graphics for viewing, editing, and/or exporting via a user computing entity 30 or a display device/input device of the preparation graphics computing entity 275B, but that are not configured and/or programmed to play the graphics live to air. For example, a live play-capable graphics computing entity 275A may be configured to provide graphics to the provider system 200 and/or CDN 10 such that the graphic is provided (e.g., via a CDN 10 and/or network 50) such that a consumer viewing the media production via a consumer device 20 may view the graphic as part of the media production. For example, a live play-capable graphics computing entity 275A may provide a graphic (e.g., to a provider system 200, a CDN 10, and/or a network 50) such that the graphic is displayed via a consumer device 20 as part of the media production.

As noted above, in general, the terms computing entity, network, network entity, entity, device, system, and/or similar words used herein interchangeably may refer to, for example, one or more computers, computing entities, desktops, mobile phones, tablets, phablets, notebooks, laptops, distributed systems, watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data/information, content, information, and/or similar terms used herein interchangeably.

Figure 3:
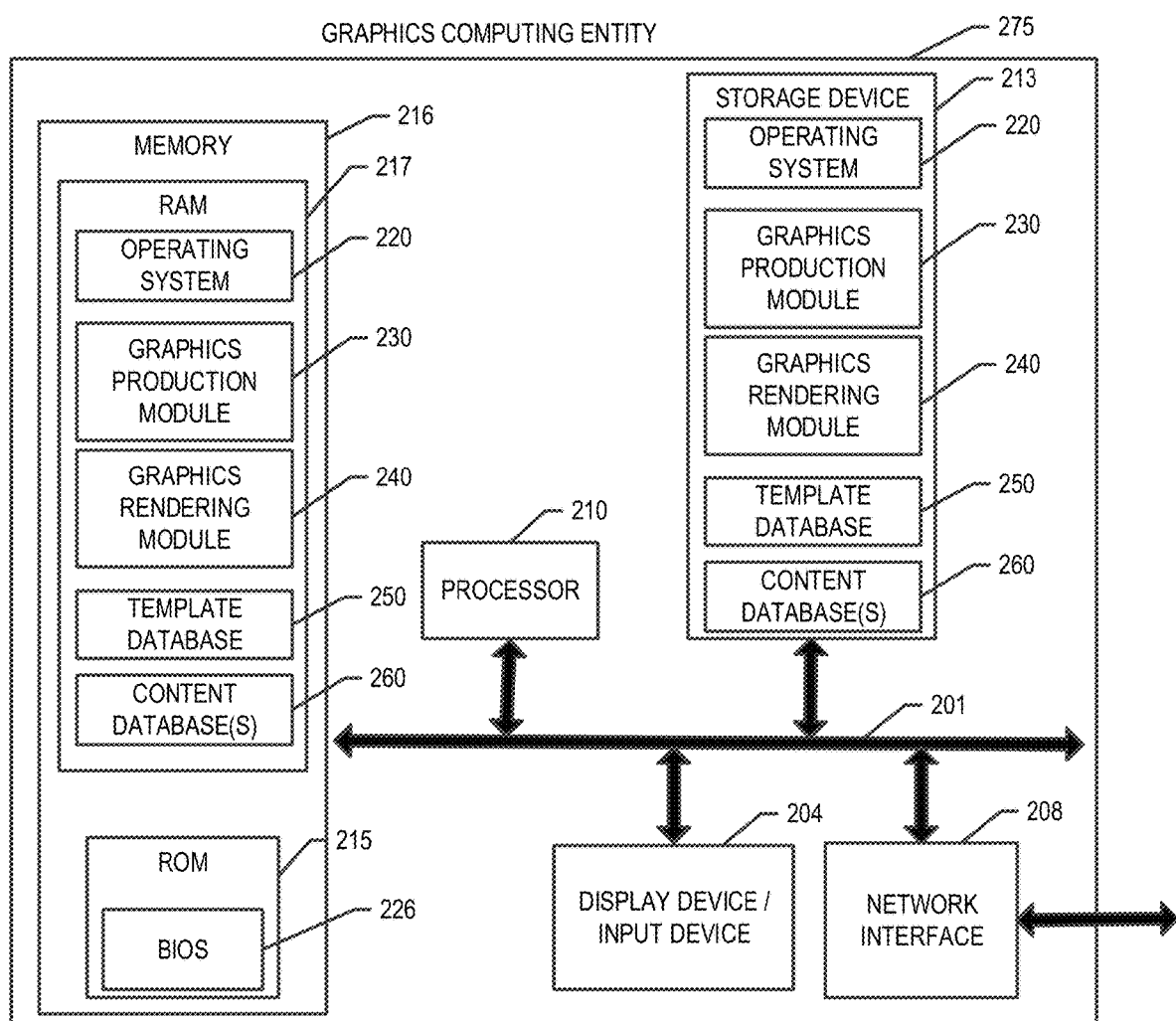
FIG. 3 is a schematic diagram of a graphics computing entity, in accordance with one embodiment of the present invention.
Figure 4:
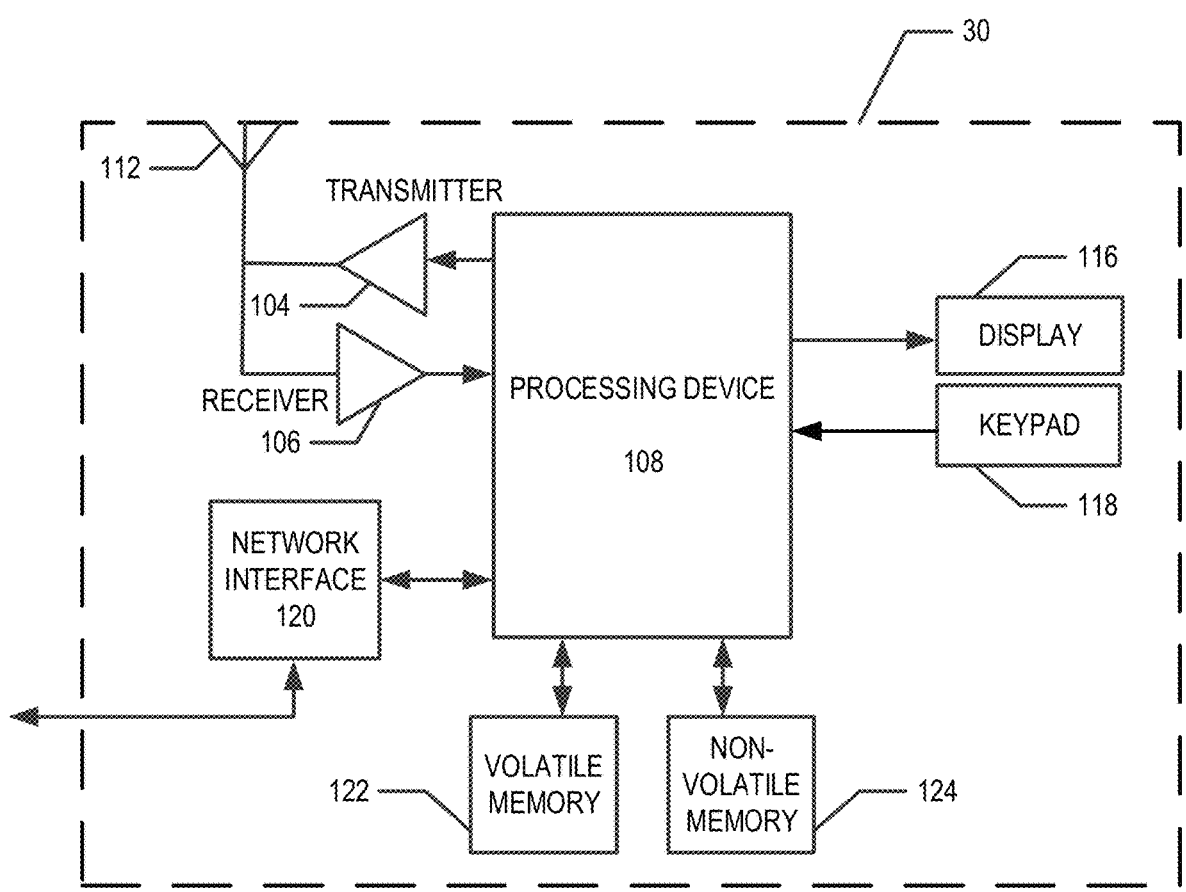
FIG. 4 is a schematic diagram of a user computing entity, in accordance with one embodiment of the present invention.

FIG. 3 provides a schematic diagram of an example graphics computing entity 275. The graphics computing entity 275 comprises a processor 210, such as one or more processing elements, which may include CPLDs, microprocessors, multi-core processors, coprocessing entities, ASIPs, and/or controllers or other processing devices or circuitry. The term circuitry may refer to an entirely hardware embodiment or a combination of hardware and computer program products. Thus, the processor 210 may be embodied as integrated circuits, ASICs, FPGAs, PLAs, hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to embodiments of the present invention, such as the embodiments illustrated in FIGS. 13A, 13B, 13C, and 14-18, when configured accordingly. The processor 210 is used to execute software instructions for carrying out the defined steps of the method of the various embodiments of the present invention. The processor 210 communicates using a data/information bus 201 that is used to convey data/information and program instructions, typically, between the processor and memory 216.

The graphics computing entity 275 further includes memory 216, which may comprise non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data/information, applications, programs, program modules, scripts, source code, object code, byte code, compiled code, interpreted code, machine code, executable instructions, and/or the like. Such code may include the graphics production module 230, graphics rendering module 240, and/or the like. The terms database, database instance, database management system, and/or similar terms used herein interchangeably may refer to a structured collection of records or data/information that is stored in a computer-readable storage medium, such as via a relational database, hierarchical database, and/or network database. In an example embodiment, the memory 216 may store databases comprising a template database 250, one or more content databases 260, and/or the like.

In at least one embodiment, the graphics computing entity 275 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data/information, applications, programs, program modules, scripts, source code, object code, byte code, compiled code, interpreted code, machine code, executable instructions, and/or the like being executed by, for example, the processor 210. Thus, the databases, database instances, database management systems, data/information, applications, programs, program modules, scripts, source code, object code, byte code, compiled code, interpreted code, machine code, executable instructions, and/or the like may be used to control certain aspects of the operation of the graphics computing entity 275 with the assistance of the processor 210 and operating system 220, graphics production module 230, and/or graphics rendering module 240.

As indicated, a number of program modules may be stored by the non-volatile and/or volatile memory. Such program modules may include the graphics production module 230, and/or graphics rendering module 240. Those skilled in the art will appreciate that other modules may be present in RAM 217 to effectuate the various embodiments of the present invention. Furthermore, rather than described modules, other modules may be used or embodiments may not be modular.

As indicated, in one embodiment, the graphics computing entity 275 may also include one or more network interfaces 208 for communicating with various computing entities, such as by communicating data/information, content, information, and/or similar terms used herein interchangeably that can be transmitted, received, operated on, processed, displayed, stored, and/or the like. For instance, the graphics computing entity 275 may be in communication with one or more provider systems 200 and/or one or more user computing entities 30 via various wired or wireless network 50. Such communication may be executed using a wired data/information transmission protocol, such as FDDI, DSL, Ethernet, ATM, frame relay, DOCSIS, PMCP, or any other wired transmission protocol. Similarly, the graphics computing entity 275 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, wireless USB protocols, any other wireless protocol, and/or any other appropriate communications protocol. In various embodiments, the graphics computing entity 275 may be configured to communicate with various computing entities to provide at least one graphic for inclusion in and/or to be provided as part of a media production.

Various information is input by a user or production staff member (e.g., operating an appropriate computing entity such as a user computing entity 30) to the graphics computing entity 275 via the network interface 208 and/or input/output device 204. This input information may include information related to a media production; one or more graphics to be produced, generated, and/or rendered; one or more updates to one or more entries in the template database 250 and/or a content database 260, and/or other information/data. This input information may vary, however, depending on the configuration and informational requirements of the graphics computing entity 275.

As mentioned above, the graphics computing entity 275 also includes an input/output device 204 for receiving and displaying data/information. The graphics computing entity 275 may include or be in communication with one or more input elements, such as a keyboard input, a mouse input, a touch screen/display input, audio input, pointing device input, joystick input, keypad input, and/or the like, as indicated by input/output device 204. The graphics computing entity 275 may also include or be in communication with one or more output elements, as indicated by input/output device 204, such as audio output, video output, screen/display output, motion output, movement output, and/or the like.

Those skilled in the art will recognize that many other alternatives and architectures are possible and can be used to practice various embodiments of the invention. The embodiment illustrated in FIG. 3 can be modified in different ways or incorporated within a network and be within the scope of the invention. For example, one or more components of the graphics computing entity 275 may be located remotely from other graphics computing entity 275 components, such as in a distributed system. Furthermore, one or more of the components may be combined and additional components performing functions described herein may be included in the graphics computing entity 275. Thus, the graphics computing entity 275 can be adapted to accommodate a variety of needs and circumstances.

User Computing Entity 30

In various embodiments, the user computing entity 30 may be configured to provide a user with a graphical user interface for producing, generating, and/or rendering one or more graphics. For example, the user computing entity 30 may store one or more local databases, such as local content databases similar to and/or that may be synchronized with the content databases 260 and/or a local template database similar to and/or that may be synchronized with the template database 250. In an example embodiment, the user computing entity 30 may further store a graphic context database similar to and/or that may be synchronized with the graphic context database stored by a graphics computing entity 275. The user computing entity 30 may operate an application resident thereon and/or access an application operating on the provider system 200 and/or a graphics computing entity 275 via a web browser such as Internet Explorer, Chrome, Safari, Firefox, and/or the like operating on the user computing entity 30. Execution of the application and/or accessing of the application may cause a GBI to be provided via a display or other input/output device of the user computing entity 30 and/or in communication with the user computing entity 30. In an example embodiment, the user computing entity 30 is configured to receive user input (e.g., via the GBI) and, based on the received user input, cause the generation, production, and/or rendering of one or more graphics by the graphics computing entity 275 via the executed and/or accessed application. In an example embodiment, the user computing entity 30 is configured to communicate with the provider system 200 and/or one or more graphics computing entities 275 via one or more wired and/or wireless networks. For example, as described above, a user computing entity 30 may be one or more computers, mobile phones, desktops, tablets, notebooks, phablets, set-top devices in communication with a television or other display device (e.g., projector or the like), smart televisions, laptops, wearable computer, and/or any combination of devices or entities adapted to perform the functions, operations, and/or processes described herein. In one embodiment, the user computing entity 30 may comprise a combination of two or more computing devices noted above and/or other computing devices. For example, a user computing entity 30 may comprise a set top box "paired" with a tablet.

In one embodiment, the user computing entity 30 may include one or more components that are functionally similar to those of the provider system 200. In one embodiment, the user computing entity 30 may include one or more processing elements, one or more display device/input devices, volatile and non-volatile storage or memory, and/or one or more communications interfaces. The user computing entity 30 may also comprise various other systems. In particular, the user computing entity 30 may include components configured to receive an enhanced media production and/or related data/information with audio, visual, and/or other output for experiencing the enhanced media production, and/or the like. The user computing entity 30 may also be in communication with a variety of computing entities.

In various embodiments, the user computing entity 30 may include or otherwise be in communication with a variety of input devices that may be configured to receive input from a user such that a user may control his/her experience of an enhanced media production. For example, in some embodiments, the user computing entity 30 may include or be in communication with a pointing device such as a computer mouse, infrared pointing device, motion detecting device, and/or the like. In other embodiments, the user computing entity 30 may include or be in communication with a joy stick, remote control, handheld controller which may include a d-pad, and/or the like. Thus, the user computing entity 30 may be configured to receive user input through a variety of input approaches and techniques.

FIG. 3 provides an illustrative schematic representative of an example user computing entity 30 that can be used in conjunction with embodiments of the present invention. As shown in FIG. 3, the user computing entity 30 can include an antenna 112, a transmitter 104 (e.g., radio), a receiver 106 (e.g., radio), and a processing device 108 (e.g., CPLDs, microprocessors, multi-core processors, coprocessing entities, ASIPs, microcontrollers, and/or controllers) that provides signals to and receives signals from the transmitter 104 and receiver 106, respectively.

The signals provided to and received from the transmitter 104 and the receiver 106, respectively, may include signaling information/data in accordance with air interface standards of applicable wireless systems. In this regard, the user computing entity 30 may be capable of operating with one or more air interface standards, communication protocols, modulation types, and access types. More particularly, the user computing entity 30 may operate in accordance with any of a number of wireless communication standards and protocols, such as those described above with regard to the provider system 200. In a particular embodiment, the user computing entity 30 may operate in accordance with multiple wireless communication standards and protocols, such as UMTS, CDMA2000, 1×RTT, WCDMA, GSM<EDGE, TD-SCDMA, LTE, E-UTRAN, EVDO, HSPA, HSDPA, Wi-Fi, Wi-Fi Direct, WiMAX, UWB, IR, NFC, Bluetooth, USB, Bluetooth low energy (BLE), ZigBee, near field communication (NFC), infrared (IR), ultra-wideband (UWB), and/or the like. Similarly, the user computing entity 30 may operate in accordance with multiple wired communication standards and protocols, such as those described above with regard to the provider system via a network interface 120.

Via these communication standards and protocols, the user computing entity 30 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 30 position in connection with a variety of other systems, including wireless towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, wireless towers, nearby computing devices (e.g., smartphones, laptops) and/or the like. For instance, such technologies may include the iBeacons, Gimbal proximity beacons, BLE transmitters, NFC transmitters, infrared transmitters, ZigBee transmitters, ultra-wideband transmitters, and/or the like. These indoor positioning aspects can be used in a variety of settings to determine the location of someone or something to within inches or centimeters.

The user computing entity 30 may also comprise a user interface (that can include a display 116 coupled to a processing device 108) and/or a user input interface (coupled to a processing device 108). For example, the user interface may be a user application, browser, user interface, and/or similar words used herein interchangeably executing on and/or accessible via the user computing entity 30 to interact with and/or cause display of information/data from the provider system 200, as described herein. The user input interface can comprise any of a number of devices or interfaces allowing the user computing entity 30 to receive data, such as a keypad 118 (hard or soft), a touch display, voice/speech or motion interfaces, or other input device. In embodiments including a keypad 118, the keypad 118 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 30 can also include volatile storage or memory 122 and/or non-volatile storage or memory 124, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 30. As indicated, this may include a user application that is resident on the entity or accessible through a browser or other user interface for communicating with the provider system 200, and/or various other computing entities.

In another embodiment, the user computing entity 30 may include one or more components or functionality that are the same or similar to those of the provider system 200, as described in greater detail above. As will be recognized, these architectures and descriptions are provided for exemplary purposes only and are not limiting to the various embodiments.

Consumer Device 20

In various embodiments, the consumer device 20 may be configured for receiving at least one media production (e.g., via the CDN 10 and/or network 50) and providing the at least one media production for consumption by a consumer. For example, the media production may be an audio and/or video media production that is provided via a display and/or speakers (and/or the like) of the consumer device 20. For example, the consumer device 20 may be one or more computers, mobile phones, desktops, tablets, notebooks, phablets, set-top devices in communication with a television or other display device (e.g., projector or the like), smart televisions, laptops, wearable computer, and/or any combination of devices or entities adapted to perform the functions, operations, and/or processes described herein. In one embodiment, the consumer device 20 may comprise a combination of two or more computing devices noted above and/or other computing devices. For example, a consumer device 20 may comprise a set top box "paired" with a tablet. In one embodiment, the consumer device 20 may include one or more components that are functionally similar to those of the provider system 200, user computing entity 30, or the CDNs 10. For example, in one embodiment, the consumer device 20 may include one or more processing elements, one or more display device/input devices, volatile and non-volatile storage or memory, and/or one or more communications interfaces. The consumer device 20 may also comprise various other systems.

IV. EXEMPLARY SYSTEM OPERATION

Example embodiments provide a system for producing, generating, publishing, and/or rendering one or more graphics for inclusion with a media production. For example, the graphics may be provided, published, and/or aired as part of a media production. In an example embodiment, a GBI is provided (e.g., via a user interface such as display 116 of a user computing entity 30). In an example embodiment, the GBI allows a user to make a single selection (e.g., provide user input indicating one user selection) to populate a plurality of fields (e.g., two or more fields) within a graphic object. A graphic object may be a data structure comprising at least some of metadata, structure information/data, style information/data, one or more fields, field values for one or more of the one or more fields, and/or the like. The one or more fields may comprise text fields and content fields. The field values of the content fields may be pathnames indicating the location of a file and/or a location within the file corresponding to a particular content item. The content items may comprise graphical content items (e.g., images, photographs, drawings, diagrams, logos, digital image captures of a social media post, raw color values corresponding to an image or logo, and/or the like) and non-graphical content items (e.g., statistics, information/data, and/or the like). In an example embodiment, a GBI is provided (e.g., via a user computing entity 30) wherein the fields, options, and/or the like provided to a user to generate, produce, publish, and/or render a graphic are constrained, adapted, modified, and/or updated based on user selection of a template, graphic context, and/or other user selections (e.g., teams and/or players playing a game that is the media production). In an example embodiment, a first template may be used for various media productions and adapted based on a user-selected graphic context for a particular media production. For example, in an example embodiment, a template may comprise and/or correspond to a predetermined and/or predefined structure information/data and predetermined and/or predefined fields corresponding thereto. For example, a template may correspond to a particular type of graphic (e.g., full screen box score, lower third topic, player transitions, and/or other types of graphics). For example, a template may define the size of the graphic, the location on the screen of the graphic, the dynamic layout of the graphic, a trigger for the graphic, content indices provided for user selection, categories provided for user selection, statistics and/or other information/data provided for user selection, and/or the like. In an example embodiment, the graphic context may comprise and/or correspond to predetermined and/or predefined style information/data. For example, the graphic context may comprise and/or correspond to a particular look and feel of a graphic.

In an example embodiment, a GBI is provided (e.g., via a user computing entity 30) wherein various graphic fields of a template may be automatically filed and/or populated based on user input indicating selections of selectable option. For example, the GBI may provide the user with a plurality of content selectors and/or other selectors. For example, each selector provides a drop down list and/or the like of a plurality of selectable options that a user may select from. For example, a player drop down menu may provide a list of players playing in the game, if the media production is a game. For example, if the media production is a Phoenix Mercury basketball game, the user may provide input selecting Diana Taurasi via a player menu and a statistic name (e.g., points per game, rebounds per game, assists per game, and/or the like) via a statistic menu, and the corresponding field of the template is automatically filed with the correct statistic and/or a pathname indicating a file and/or a location within a file where the correct statistic is stored. In an example embodiment, selection of Diana Taurasi from the player menu may cause her current publicity photograph to be identified and a pathname where the current publicity photograph is stored in the content database 260 (or in the content database stored by the user computing entity 30) may be inserted into a player picture field of the graphic object. In an example embodiment, selection of Diana Taurasi from the player menu may cause a pathname for the logo of the team she plays for to be added to a team logo field of the graphic object. In an example embodiment, selection of Diana Taurasi from the player menu may cause a corresponding text field to be populated with the string "Diana Taurasi." Various text and/or content fields of the graphic object may be automatically filled and/or populated based on the single selection of Diana Taurasi from the player menu. Thus, a plurality (e.g., two or more) fields of the graphic object may be automatically populated in response to a single user selection of a selectable option (e.g., via a selector provided via the GBI). In various embodiments, the GBI may provide the user with a plurality of selectors that each provide a plurality of selectable options. In an example embodiment, wherein the media production is a professional basketball game (or other team sport sporting event), the plurality of selectors may comprise one or more team menus, one or more player menus, one or more statistics menus, one or more category menus, and/or the like. The plurality of selectors provided to the user may be determined based on the predetermined and/or predefined fields of the user-selected template.

In an example embodiment, a user may (e.g., via the GBI provided by a user interface such as the display 116 of the user computing entity 30) produce, generate, and/or render one or more graphics before a media production enters production. The pre-generated graphics may be exported as still graphics, animated graphics, and/or as graphic documents (e.g., a text file and/or other moderately-sized file comprising and/or encoding the graphic object) and applied, published, rendered, aired, and/or added to the media production during production of the media production. For example, a graphic document may be a file that encodes one or more graphics and is a kilobyte scale sized file. For example, the graphic document may comprise the graphic object of one or more graphics. In an example embodiment, the graphic document is a plain text file or other text file. In particular, the graphic document is moderately-sized such that the encoding of the one or more graphics may be easily shared between users and/or between user computing entities 30 and/or graphics computing entities 275. For example, a graphic document may be attached to an email or transferred via another file transfer process quickly and easily because the graphic document is moderately-sized (e.g., kilobyte scale rather than Megabyte scale).

In an example embodiment, a graphic document may be opened, read, and/or the like by the GBI (e.g., via the user computing entity 30, graphics computing entity 275, and/or the like). The graphics rendering module 240 may render, publish, and/or the like the one or more graphics encoded in the graphic document based on the encoding of the one or more graphics stored in the graphic document. For example, the graphics rendering module 240 may read a graphic object from the graphic document, access the content items referenced by the pathnames in the content fields of the graphic object, and render, publish, and/or the like the graphic. In an example embodiment, it may be determined if one or more content items referenced by a pathname in the graphic object have been updated since the graphic was originally generated. For example, the content item may be a publicity photograph of a player and it may be determined if a new publicity photograph of the player has been published and/or issued since the graphic was originally generated. In another example, the content item may be a sponsor logo and it may be determined if the sponsor and/or the sponsor logo has changed since the graphic was originally generated. For example, in an example embodiment, the graphic object may comprise one or more raw color values (e.g., in RGB, cmyk, or other color value) of a portion of a content item referenced by a pathname in the graphic object. For example, the raw color value may be a background color, color at a particular location within an image corresponding to the content item, the color value of one or more specified pixels of the image corresponding to the content item, and/or the like. The raw color value stored in the graphic object may then be compared to a corresponding current raw color value of a current image corresponding to the content item and/or the like. If the raw color values from the graphic object and the current raw color value are the same and/or match, then the content item has likely not been updated since the graphic was originally generated, defined, and/or the like. If the content item was updated, the pathname in the graphic object may be updated to reflect the pathname for the current content item within the working memory corresponding to the GBI and/or graphics rendering module 240. In an example embodiment, the graphic document may be updated to reflect the pathname for the current content item. The graphic may then be rendered, published, and/or the like using the current content item. Various aspects of example embodiments will now be described in more detail.

Exemplary User Process for Generating a Graphic

Figure 5:
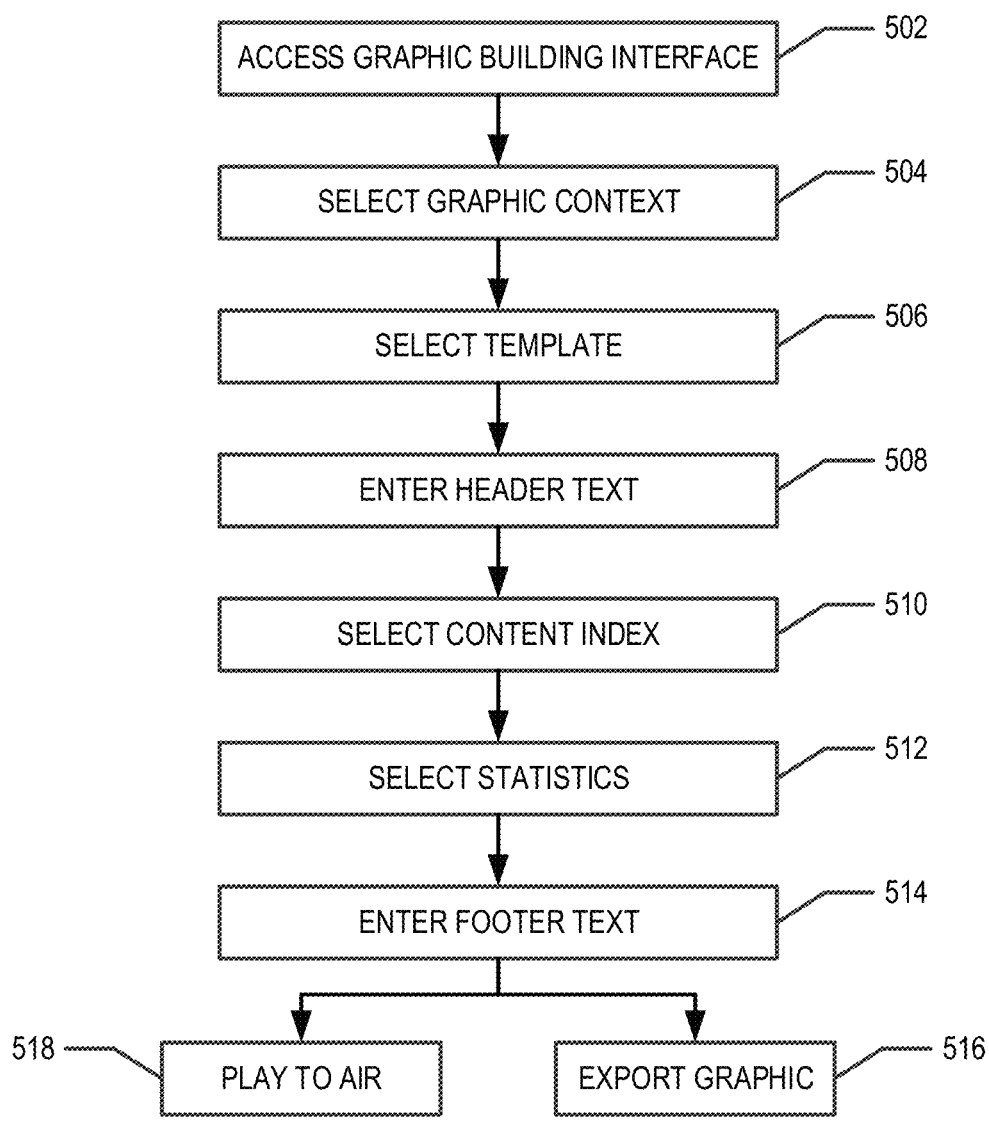
FIG. 5 is a flowchart illustrating processes and operations performed by a user to produce, generate, and/or render a graphic for broadcasting as part of a media production, in accordance with one embodiment of the present invention.

FIG. 5 illustrates processes, procedures, and/or operations completed by a user operating a user computing entity 30 to access a GBI to generate an example graphic, according to an example embodiment. Starting at block 502, a user may operate a user computing entity 30 to access a GBI. For example, the user may operate the user computing entity 30 to open a window, application, program and/or the like to access a GBI (e.g., provided via the graphics production module 230). In an example embodiment, a user may operate a user computing entity 30 to open a web browser, initiate a communication session (e.g., via one or more wired or wireless communication networks 50) with a provider system 200, and access a graphics production module 230 of a graphics computing entity 275. The graphics module 230 may then provide a GBI (e.g., via the display 116) to the user via the web browser, and/or the like.

Figure 6:
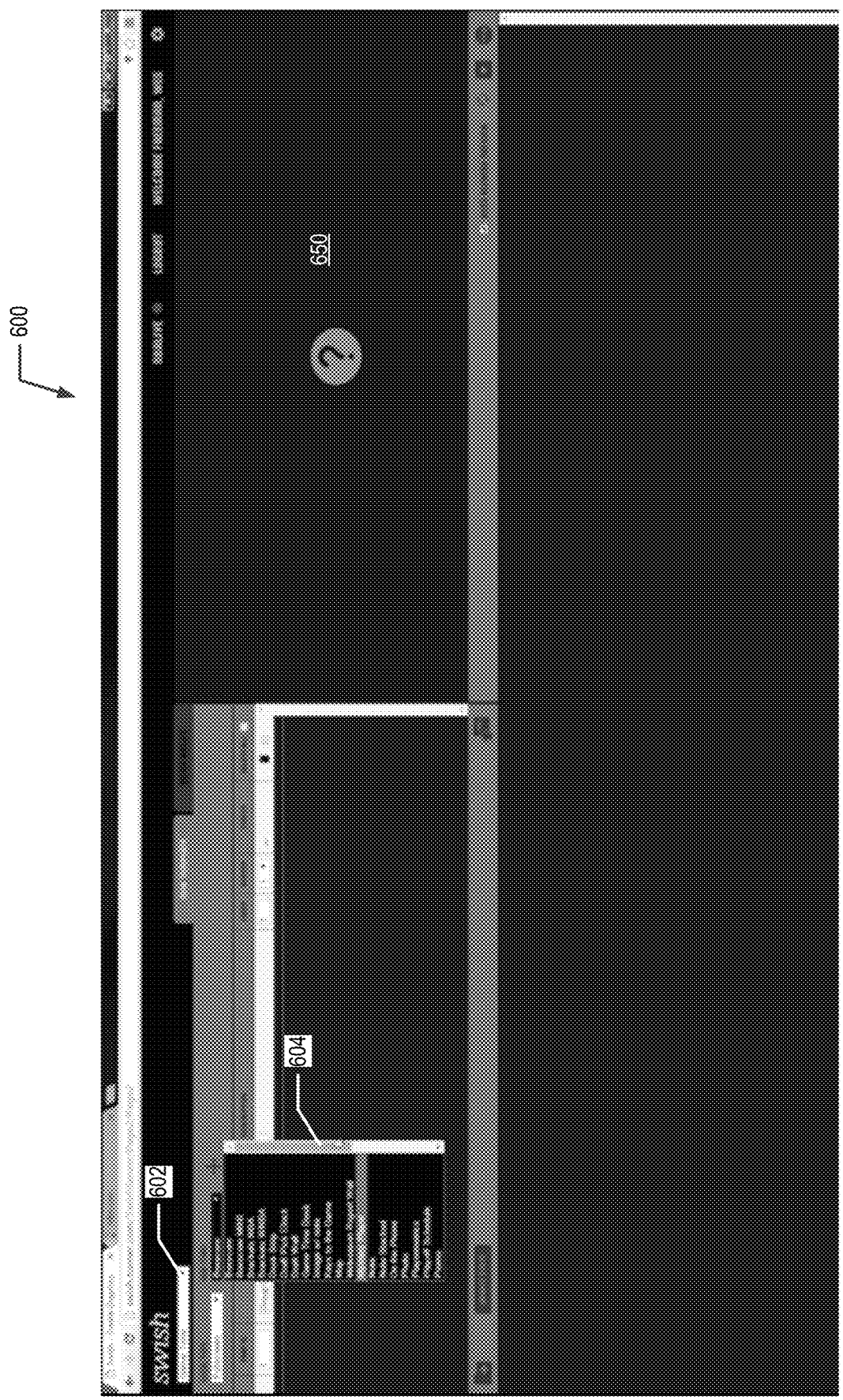
FIGS. 6-12 illustrate various views of an interactive GBI for user interaction for producing, generating, and/or rendering graphics for broadcasting as part of a media production, in accordance with one embodiment of the present invention.

FIG. 6 provides an example screen view of a GBI 600. For example, the GBI 600 may comprise a graphic preview area 650, a graphic context menu 602, a template menu 604, and/or the like. For example, the graphic context menu 602 may provide a user with a plurality of selectable options (e.g., a plurality of selectable graphic context indicators and/or the like). For example, the graphic context menu 602 may provide the user with a list of available graphic contexts that the user may use to provide input to the GBI (e.g., via keyboard 118, a mouse, a touchscreen, remote control, joy stick, and/or other input device of the user computing entity 30) to select a graphic context from the list of available graphic contexts. For example, the template menu 604 may provide a user with a plurality of selectable options (e.g., a plurality of selectable template indicators and/or the like). For example, the template menu 604 may provide the user with a list of available templates that the user may use to provide input to the GBI (e.g., via keyboard 118, a mouse, a touchscreen, remote control, joy stick, and/or other input device of the user computing entity 30) to select a template from the list of available templates.

Continuing with FIG. 5, at block 504, the user may select a graphic context. For example, the GBI 600 may provide the user with a plurality of graphic contexts (e.g., via a drop down menu and/or the like) from which the user may provide input to select a graphic context. For example, each graphic context of the plurality of graphic contexts may correspond to a show (e.g., a television show or series), a sports league, a network, and/or the like. The user may use an input device of the user computing entity 30 to select a graphic context from the plurality of graphic contexts. For example, in an example embodiment, the user may select a show from a plurality of shows. The selected show may be a show that corresponds to the media production for which the graphic is being generated. For example, the media production may be an episode of the show. A selected graphic context may define style information/data for the corresponding graphic object. For example, the selected graphic context may define a text font, a logo, background colors, a sponsor, animation effects, and/or the like, of the graphic object. For example, the graphic context may define the style information/data required to make the graphic consistent with the style guide, design, and/or look and feel of the show.

At block 506, the user may select a template. For example, the GBI 600 may provide the user with a plurality of templates (e.g., via a drop down menu and/or the like) from which the user may provide input to select a template. The user may use an input device of the user computing entity 30 to select a template from the plurality of templates. For example, each template of the plurality of templates may correspond to a particular type of graphic. For example, each template may define a predetermined and/or predefined set of fields (e.g., text fields and/or content fields) and structure information/data. For example, the template defines a dynamic layout and available fields for the graphic. For example, the dynamic layout of the template may determine the layout of the user-selected content of the graphic based on the number of content indices, categories, statistics, and/or other information/data selected by the user. In an example embodiment, the fields may comprise text fields and content fields. In an example embodiment, the field value of a text field may be a string of text. For example, a user may enter (e.g., type) a text string into an appropriate field of the GBI to populate the text field with a string of text and/or to define the field value as a sting of text. In an example embodiment, the field value of a content field may be a pathname that identifies a file and/or a location within the file where the intended content item is located. For example, the content item may be a graphic content item such as an image (e.g., photograph, logo, diagram, drawing, and/or the like). In another example, the content item may be a non-graphic content item such as a statistic or data/information (e.g., a team's record, a basketball player's height and position, and/or the like).

Figure 7:
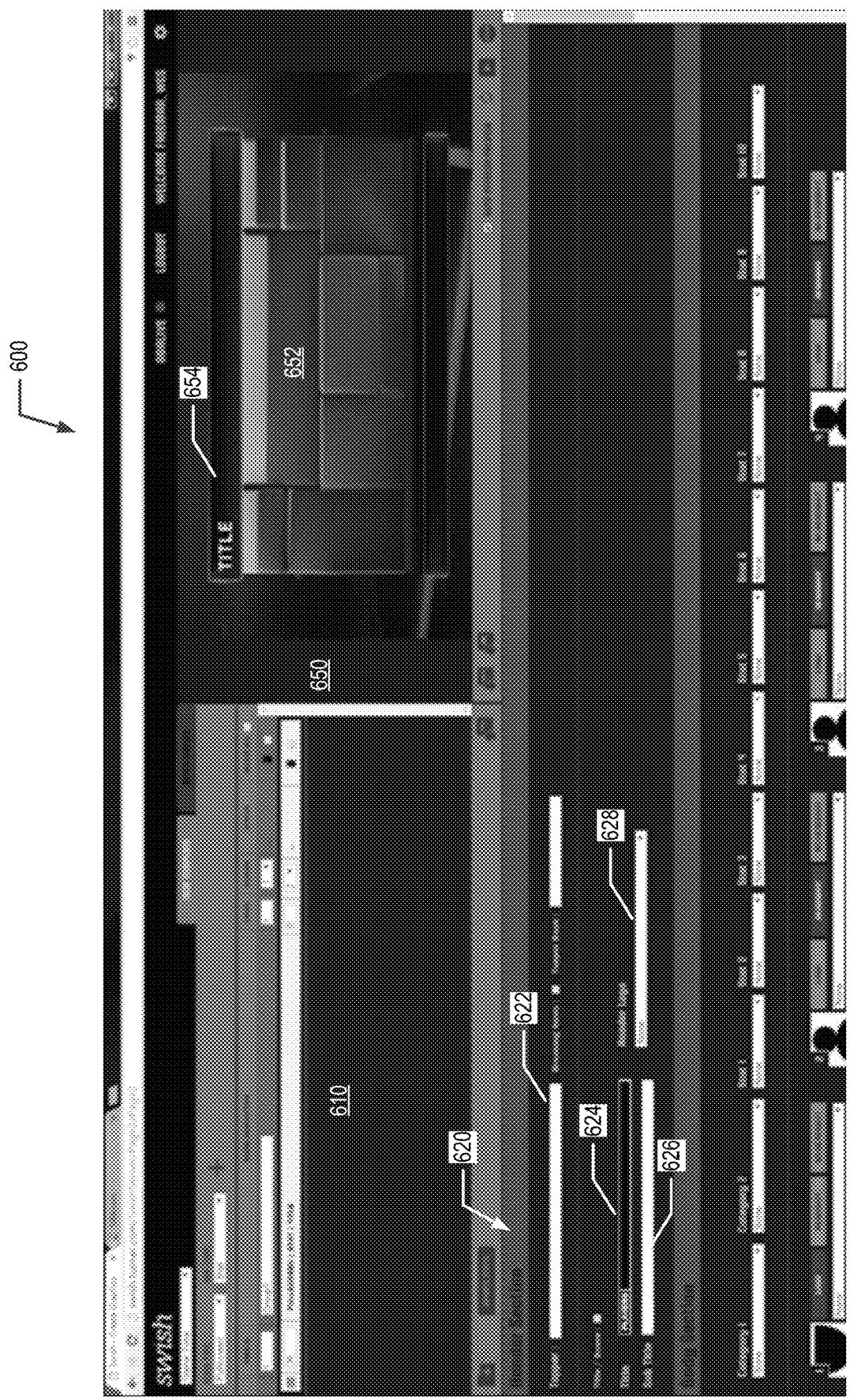

After the user selects the template, the GBI 600 may update to provide the user with a preview of the graphic and a plurality of input mechanisms (e.g., selectors, text entry fields, and/or the like). For example, in response to the user selecting the template and/or the graphic context, a graphic object may be generated based on the selected template and/or graphic context (e.g., comprising the style information/data defined by the graphic context and/or the predetermined and/or predefined plurality of fields and structure information/data defined by the template). FIG. 7 illustrates the GBI 600 after the graphic object has been generated, according to an example embodiment. For example, the GBI 600 comprises a current graphic projects portion 610, providing a selectable and/or clickable list of the graphics objects that the user currently has open for editing via the GBI 600. For example, the GBI 600 may provide a preview 652 of the graphic in the graphic preview area 650. One or more other areas of the GBI 600 may be populated with selectors and/or text input fields based on the predetermined and/or predefined set of fields of the user-selected template.

For example, in the illustrated example embodiment, the user-selected template comprises predetermined and/or predefined fields that are organized into a header section, a body section, and a footer section. Header section 620 provides the user with a trigger selector 622 for selecting one or more graphics triggers from a plurality of user-selectable graphics triggers and/or allow a user to enter criteria corresponding to a graphics trigger. In an example embodiment, the graphics trigger may indicate an event or flag in a media production which will trigger the providing and/or airing of the graphic as part of the media production. For example, if the graphic is a score board graphic displaying the score, the graphic may be triggered every time the media production returns from a commercial break. Various graphics triggers may be used as applicable for the graphic, media production, and/or the like. The header section 620 may further comprise a title field 624 and/or a sub title field 626. For example, the user may select the title field 624 and enter text for the title (e.g., via a hard or soft keyboard in communication with and/or provided by the user computing entity 30). Similarly, the user could select the sub title field 626 and enter sub title text. The user computing entity 30 may receive the input providing the title text and/or sub title text via the corresponding title field 624 and/or sub title field 626 and update the corresponding fields of the graphic object accordingly. In an example embodiment, the header section 620 may further comprise a selector for a header logo 628. For example, the user may providing input selecting a league logo, team logo, sponsor logo, show logo, and/or the like to be included in the header of the graphic.

Continuing with FIG. 5, at block 508, the user may enter the title text. For example, the user may select the title field 624 and enter (e.g., via a soft or hard keyboard and/or the like) a title for the graphic. The user computing entity 30 may receive the input providing the title text and update the graphic object accordingly. For example, the user computing entity 30 may update the graphic object based on the user-entered title text or the user computing entity 30 may provide the user-entered title text to the graphics computing entity 275 and the graphics computing entity 275 may update the graphic object accordingly. The graphics computing entity 275 and/or user computing entity 30 may then update the graphic preview 652 provided by the GBI 600 based on the updated graphic object.

Figure 8:
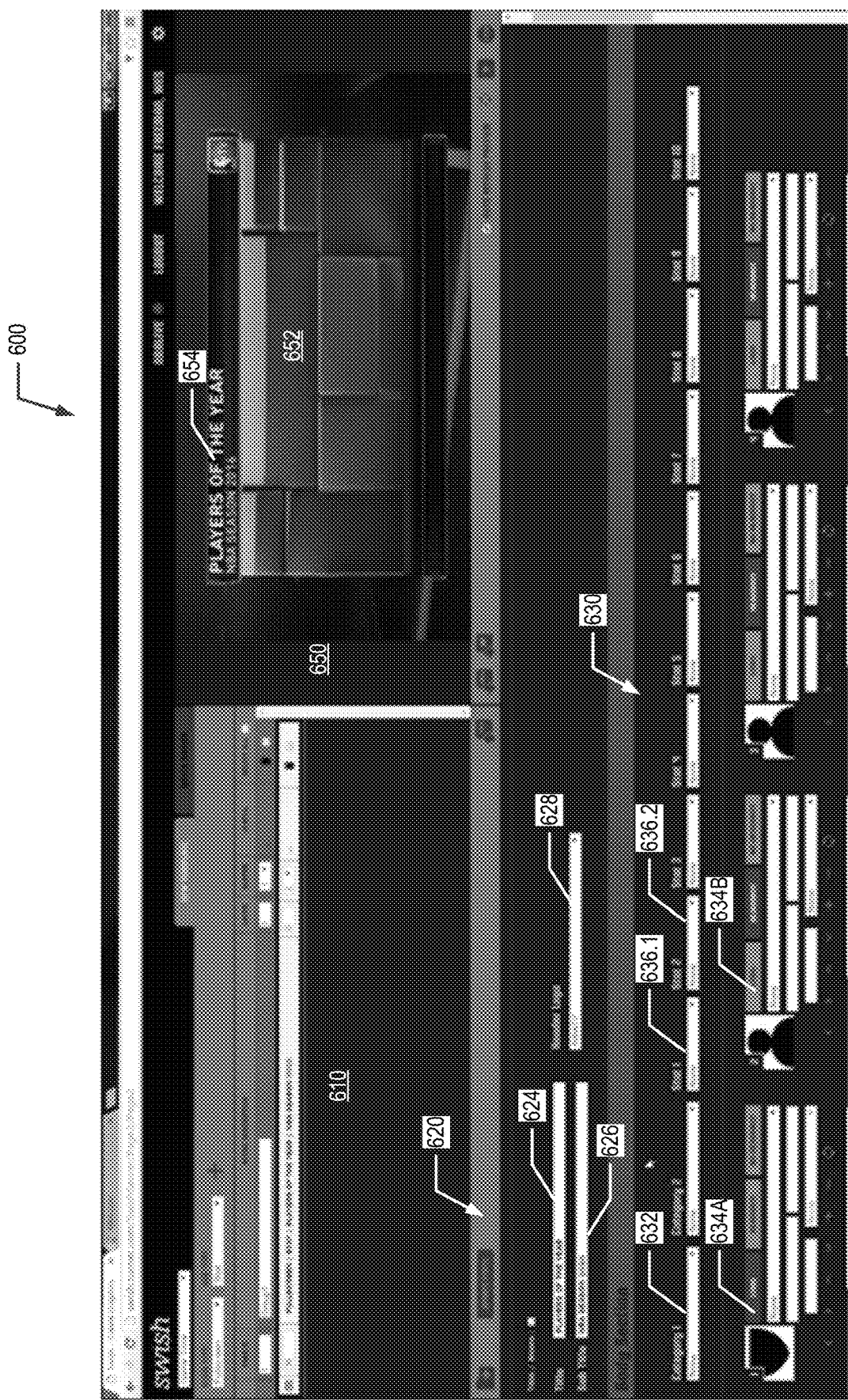

As shown in FIG. 8, the header section 654 of the graphic preview 652 has been updated based on user entered title text, sub-title text, and a user-selected header logo. For example, a user has entered the text "PLAYERS OF THE YEAR" in the title field 624, the text "NBA Season 2016" in the sub text field 626, and selected the NBA logo via a selector for the header logo 628. As shown by FIG. 8, the body section 630 of the GBI 600 provides a user with one or more content selectors (e.g., 632, 634, 636) by which a user may select content by selecting a selectable option from a plurality of selectable options. In an example embodiment, the combination of user selections selected via the content selectors determines the content of the graphic.

Figure 9:
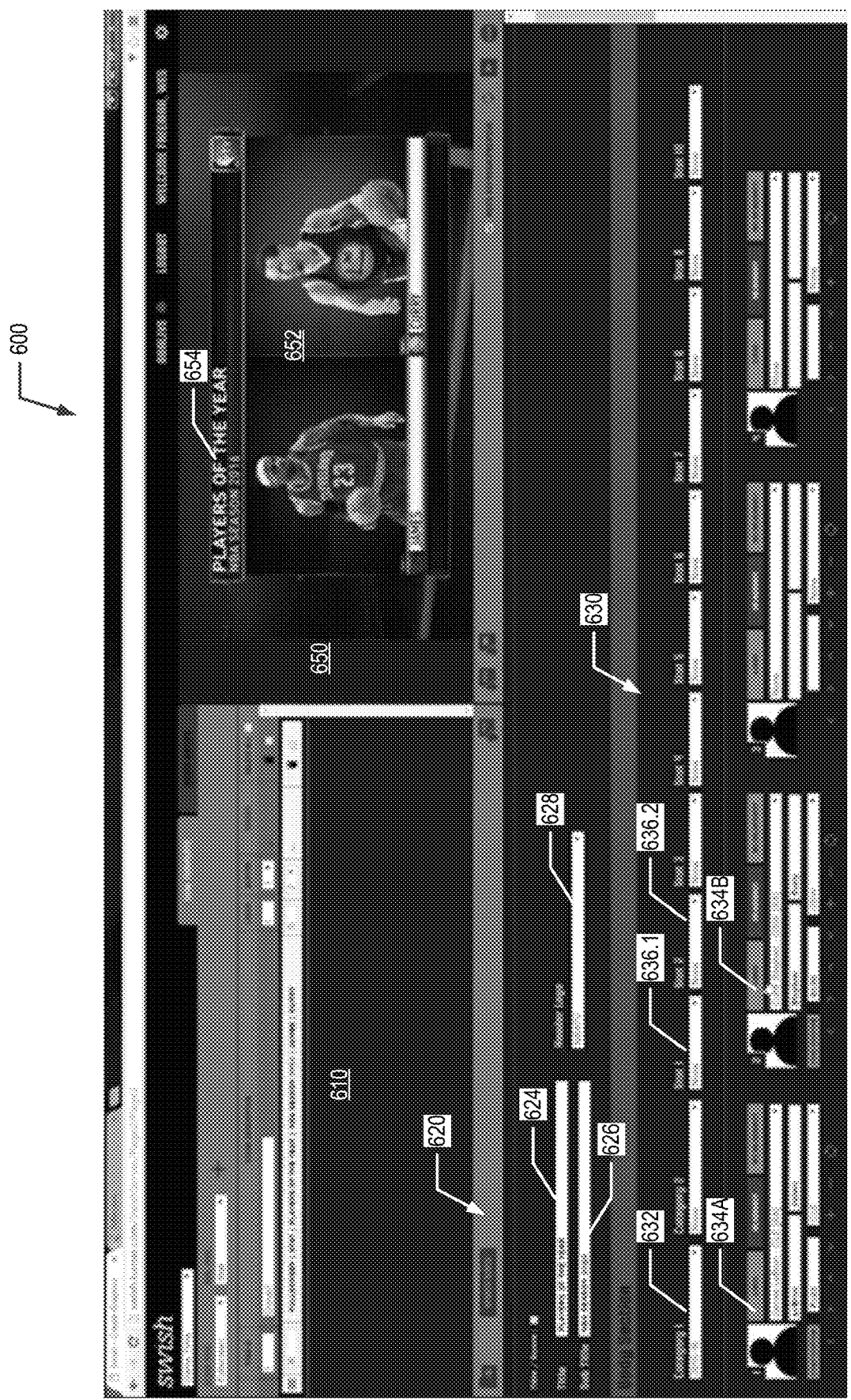

Continuing with FIG. 5, at block 510, a user may select one or more content indexes. For example, the body section 630 of the GBI 600 may provide the user with one or more content index selectors 634 (e.g., 634A, 634B), as shown in FIG. 9. For example, a content index selector 634 may provide a user with a plurality of selectable options each corresponding to a content index. The number of content index selectors 634 provided by the GBI 600 and/or the context indexes available for selection may be determined based on the predetermined and/or predefined set of fields of the user-selected template. In the illustrated example, each content index corresponds to an NBA player. The user has selected two content indexes (e.g., LeBron James and Stephen Curry). In response to receiving the user selection of a content index, one or more fields of the graphic object may be automatically filled. For example, the field corresponding to a player photograph is automatically filled with the pathname for a publicity photograph for the player identified by the selected content index. Additionally, a field of the graphic object corresponding to a name for the content index is automatically filled with the selected player's last name and a field of the graphic object corresponding to a pathname to a team logo for the player's team are automatically updated and/or populated based on the user selection of the content index via the content index selector 634 (e.g., 634A, 634B). The graphic preview 652 may be updated accordingly to include the photographs referenced by the updated graphic object.

Returning to FIG. 5, at block 512, the user may select one or more statistics to include in the graphic. As should be understood the particular statistics provided for a user to choose from, the number of statistics a user may select, and/or the like may be determined by the predetermined and/or predefined set of fields of the user-selected graphic template. In an example embodiment, the user may select one or more categories 632 for the statistics or other selectable information, as shown in FIG. 9. For example, the categories 632 provided for user selection (e.g., via a drop down menu or the like) may include background information/data (e.g., position, height, weight, college, previous teams, affiliations, titles and/or awards, and/or the like), season averages, season totals, career averages, career highs, career totals, present game single game statistics, previous single game statistics, and/or the like. For example, the body section 630 of the GBI 600 may include one or more pull down menus (or other selectors providing a plurality of selectable options) from which the user may select one or more categories via a category selector 632 and/or one or more statistics and/or other information via corresponding statistics and/or other information/data selectors 636 (e.g., 636.1, 636.2) or other information/data (e.g., background information/data and/or the like). In an example embodiment, the one or most statistics and/or other information/data provided as a user-selectable option via the statistics and/or other information/data selectors 636 may be determined based on the user selected category or categories (e.g., via category selector(s) 632). In response to receiving user input selecting one or more statistics and/or other information/data via the statistics and/or other information/data selectors 636 via the GBI 600 the user computing entity 30 (and/or the graphics computing entity 275) may identify a pathname for each selected statistic and/or other information/data for each user-selected content index. For example, the pathname identified for a first selected statistic (e.g., selected via user input via a first statistic selector 636.1) for a first content index (e.g., selected via user input via a first content index selector 634A) may identify a file and/or a location within the file where a value of the first statistic corresponding to the first content index is located and update the appropriate field(s) of the graphic object accordingly. Thus, one or more fields of the graphic object may be automatically filled and/or populated with a pathname and/or the appropriate information/data based on a user selection of a selectable option provided via the GBI 600.

Figure 10:
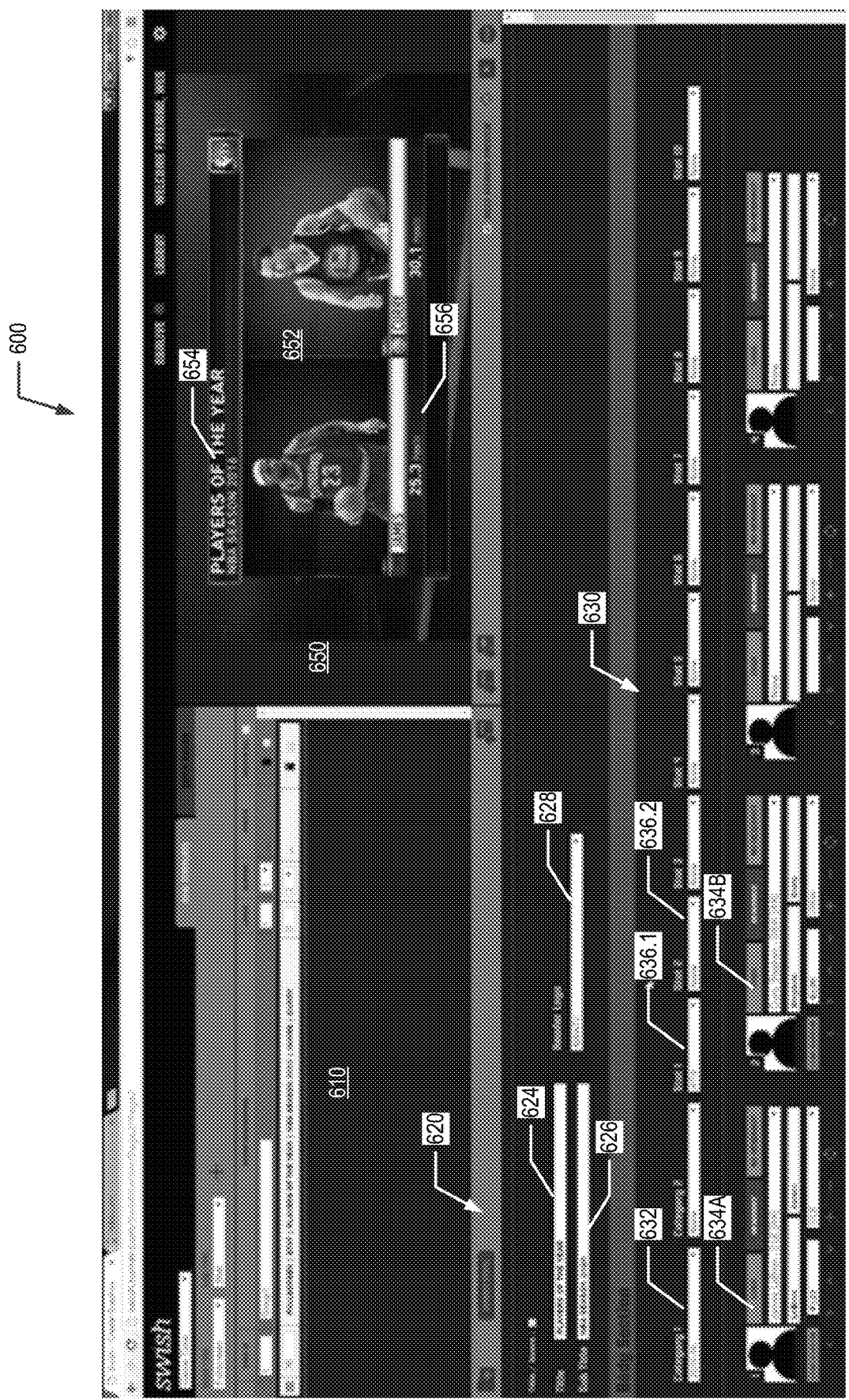

After updating the graphic object, the GBI may provide an updated graphic preview 652 via the graphic preview area 650, as shown in FIG. 10. For example, the user computing entity 30 and/or the graphics computing entity 275 may generate an updated graphic preview 652 and cause the updated graphic preview 652 to be provided (e.g., displayed) via the GBI 600. For example, the illustrated graphic preview 652 has been updated to include the user-selected statistics 656. As should be understood, the file containing the statistics may be updated in real time or near real time during a live media production (e.g., a live basketball game). The use of the pathname to identify the statistic within the graphic object allows for the statistic included in the graphic object to be the most current available statistic (e.g., real time or near real time accurate) when the graphic encoded by the graphic object is published and/or played to air as part of the media presentation.

Figure 11:
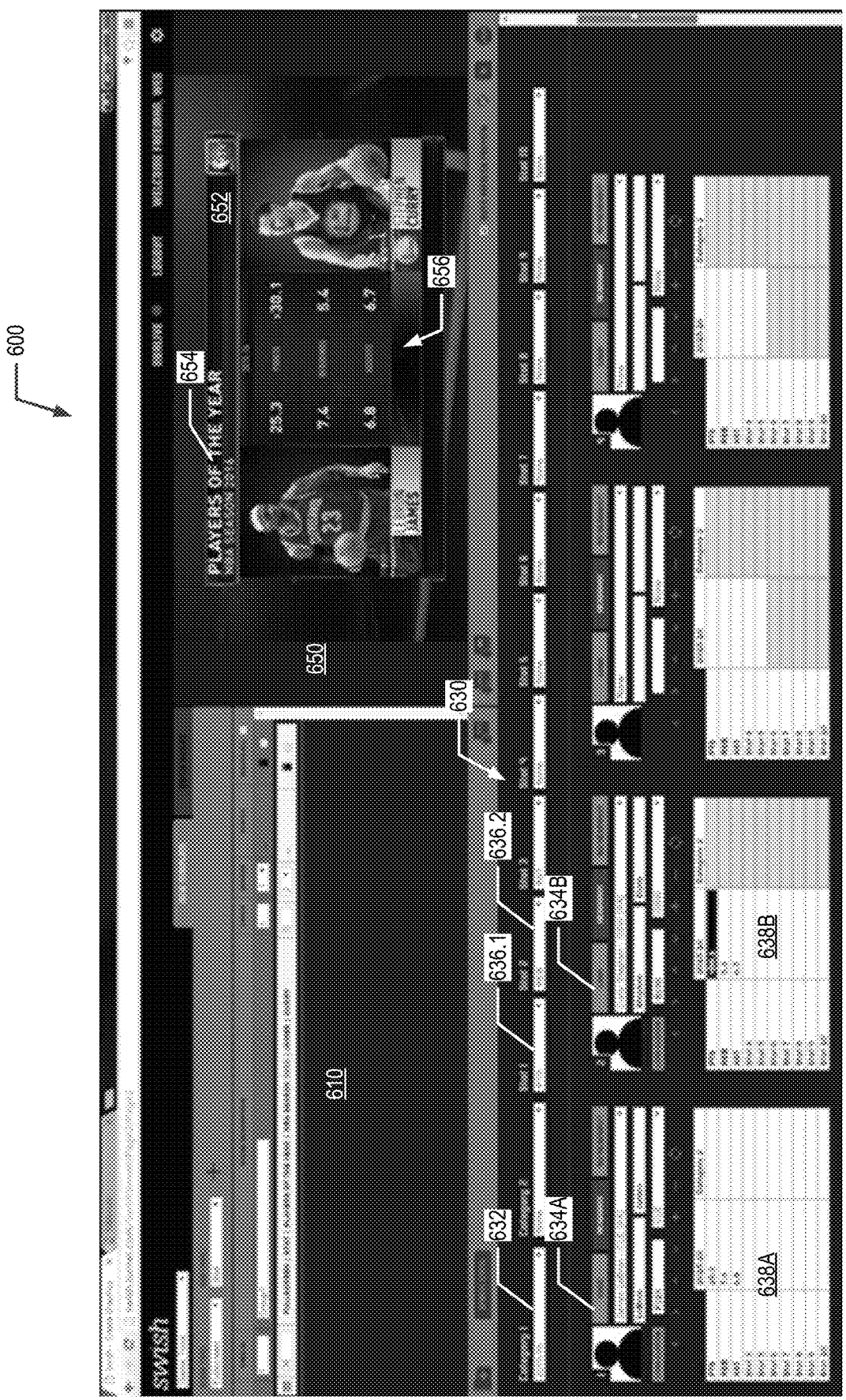

As noted above, a user may select one or more statistics and/or other information/data to be displayed as part of the graphic via one or more statistics and/or other information/data selector 636. FIG. 11 shows a graphic preview 652 that has been updated to include three user-selected statistics 656. As should be noted, the layout of the graphic has been automatically updated based on the number of selected statistics. For example, the graphic preview 652 has been modified based on the user-selected statistics. The modification and/or update of the layout of the graphic is determined based on the structure information/data (e.g., the dynamic layout) of the graphic template. As also shown in FIG. 11, the body section 630 of the GBI 600 may further include statistics and/or information/data tables 638 (e.g., 638A, 638B). For example, a statistic and/or information/data table 638 may display the user-selected statistics for one or more user selected categories for the corresponding content index (e.g., selected via the corresponding content index selector 634). After a user selects a content index (e.g., player(s) or team(s)) and a statistic (e.g., tonight's rebounds, tonight's steals, tonight's three point shots, etc.), for example, the real time or near real time accurate statistic (e.g., amount of rebounds and/or the like as appropriate for the user-selected statistic) will be displayed in the statistic and/or information/data table 638 of the GBI 600 as well as the on-air graphic and/or graphic preview 652. The statistic is automatically updated the on-air graphic, the graphic preview 652, and/or the statistic and/or information/data table 638 automatically as the night goes on. For example, the on-air graphic, the graphic preview 652, and/or the statistic and/or information/data table 638 may be automatically updated throughout a live media presentation without the user having to manually change the graphic.

Figure 12:
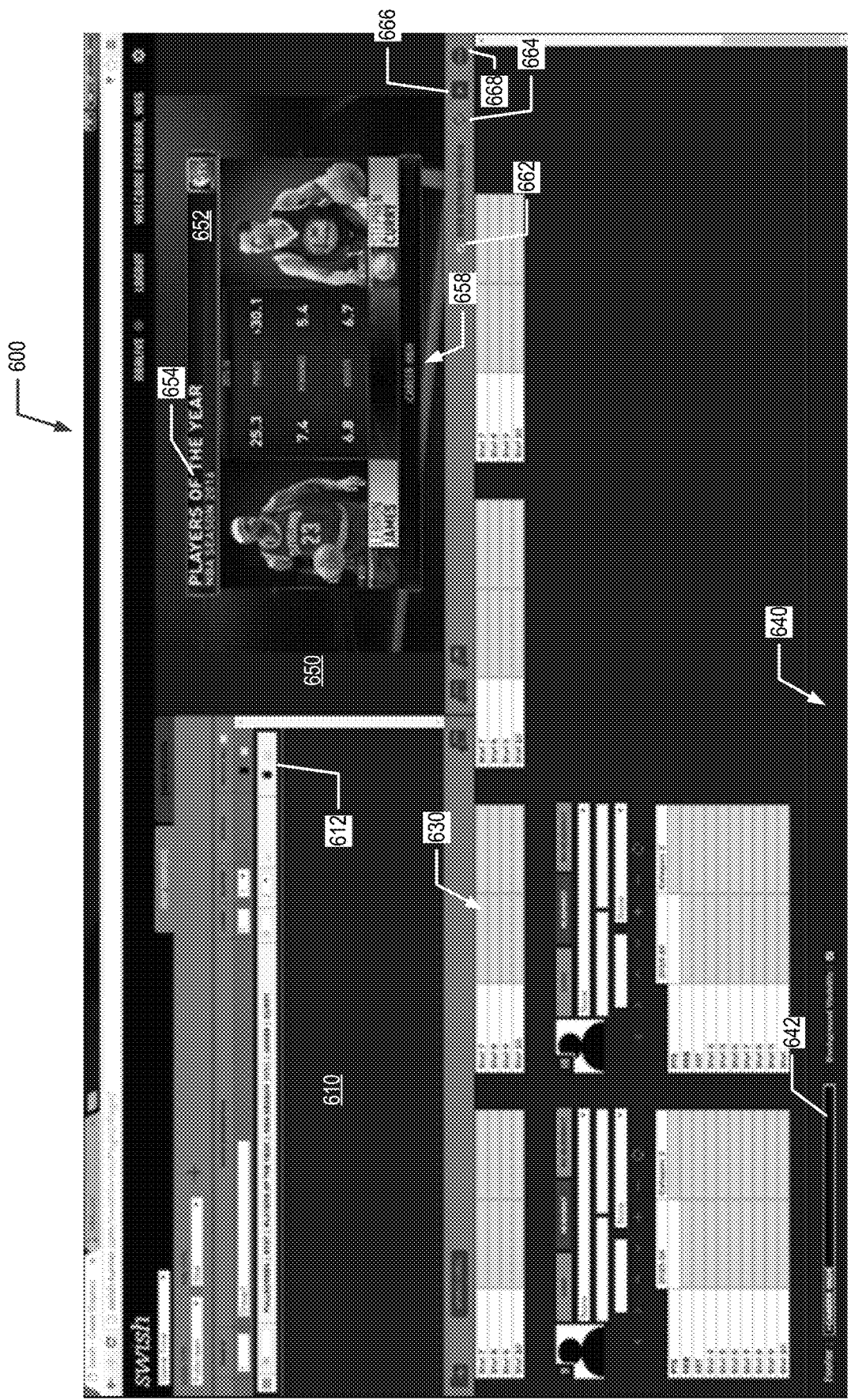

Returning to FIG. 5, at block 514, the user may enter the footer text. For example, the user may select the footer field 642 located in the footer section 640 of the GBI 600 and enter (e.g., via a soft or hard keyboard and/or the like) footer text for the graphic. The user computing entity 30 may receive the input providing the footer text and update the graphic object accordingly. For example, the user computing entity 30 may update the graphic object based on the user-entered footer text or the user computing entity 30 may provide the user-entered footer text to the graphics computing entity 275 and the graphics computing entity 275 may update the graphic object accordingly. The graphics computing entity 275 and/or user computing entity 30 may then update the graphic preview 652 provided by the GBI 600 based on the updated graphic object. For example, FIG. 12 illustrates the graphic preview 652 updated to include the footer text "career high," corresponding to the footer text entered in the footer field 642. For example, the user-selected category 632 may be a career high statistics category.

In the process described above, the user has selected the automatic preview update option 662. In an example embodiment, the user may select to not have the graphic preview 652 update automatically by unselecting the automatic preview update option 662. If the automatic preview update option 662 is turned off (and/or is unselected) the user may request the graphic preview 652 to be updated by selected the update preview button 664. If the user wishes to view a preview of the graphic as an animated graphic, rather than a still graphic preview, the user may select the animation preview button 666.

Continuing with FIG. 5, if the graphic is being generated during the media production, the graphic may be played, published, rendered, and/or the like live to air, at block 518. For example, if the user has established a communication session with a live play-capable graphics computing entity 275A and/or is working directly on a live play-capable graphics computing entity 275A (e.g., the user is accessing the GBI 600 directly through the graphics computing entity rather than through a user computing entity 30) the user may select to produce, generate, and/or render the generated graphic live to air during the production and/or broadcasting of a live media production. If the user is operating a user computing entity 30 in communication with a preparation graphics computing entity 275B (or a live play-capable graphics computing entity 275A), the user may choose to export the generated graphic at block 516. For example, the user may select to export the generated graphic as a graphic file comprising a still graphic (e.g., a JPEG file, a GIF file, a bitmap file, and/or the like), a graphic file comprising an animated graphic (e.g., an MP3 file, GIF file, flash file, and/or the like), and/or a graphic document (e.g., a plain text file, word file, and/or the like). For example, the user may select one or more graphics via the current graphic projects portion 610 by selecting selection box 612 and/or the like. The user may then select the desired one or more export types (e.g., still graphic, animated graphic, graphic document). Responsive to receiving the user input to export the graphic, the user computing entity 30 and/or the graphics computing entity 275 may generate the requested file and cause the file to be stored to the local memory (e.g., 122, 124) of the user computing entity 30. The user may then use the generated graphics file, email the generated graphic document, and/or the like as desired. For example, the user may email a generated graphics document to a graphics operator who will be controlling a live play-capable graphics computing entity 275A during the production of a live media production. The graphics operator may use the graphics document to regenerate the graphics previously generated by the user and play, publish, render, and/or the like the regenerated graphics live to air as part of the media production.

As should be understood, the particular process for generating an individual graphic will be dependent on the user-selected template and the information/data and/or visual the user is aiming to provide with the graphic. The processes, procedures, and operations described with respect to FIG. 5 are provided as an illustration of how a user may generate an example graphic corresponding to the graphic preview 652 shown in FIG. 12.

As should be understood, the instances of a plurality of user-selectable options are described above and elsewhere herein as being provided via a drop down menu. For example, as illustrated in FIG. 6, the template may be selected by a user via template menu or selector 604 (e.g., a drop down menu). However, in various embodiments, a list and/or collection of a plurality of user-selectable options may be provided to a user via various techniques. For example, a plurality of user-selectable options may be provided as a list and/or collection via a drop down menu, dialogue box, pop-up window, a list and/or collection displayed directly via the GBI 600, and/or the like.

Exemplary Graphics Computing Entity Process for Generating a Graphic

FIGS. 13A, 13B, and 13C together provide a flowchart illustrating processes, procedures, and operations that may be performed by a graphics computing entity 275 to generate an example graphic, according to an example embodiment. Starting at block 1302, a communication session may be established between the graphics computing entity 275 and a user computing entity 30. For example, the graphics computing entity 275 may receive a request to establish a communication session (e.g., via a network interface 208) from a user computing entity 30 and/or a provider system 200. Responsive to receipt and/or processing of the request to establish a communication session (e.g., via the network interface 208 and/or processor 210), the graphics computing entity 275 may establish a communication session with the user computing entity 30. In an example embodiment, a provider system 200 may act as an intermediary between the user computing entity 30 and the graphics computing entity 275. Establishment of the communication session with the user computing entity 30 may cause the user computing entity 30 to provide the user with a GBI 600 via a display 116 and/or the like of the user computing entity 30. For example, the GBI 600 may be provided based on and/or via the graphics production module 230 operating on the graphics computing entity 275 and/or a similar application, program, module, and/or the like operating on the user computing entity 30.

At block 1304, the content database and/or template database stored by the user computing entity 30 may be synchronized with the content database 260 and/or template database 250 stored by the graphics computing entity 275. In various example embodiments, the content database 260 may comprise graphic files comprising graphic content items and/or data files comprising non-graphic content items. In various embodiments, the template database may store templates comprising structure information/data and predetermined and/or predefined sets of fields. For example, the graphics computing entity 275 may provide (e.g., transmit via the network interface 208) a directory listing and/or the like corresponding to the content database 260 and/or template database 250. The user computing entity 30 may receive the directory listing and/or the like and provide an indication of the content items, templates, files, and/or the like that are not present within the content database and/or template database stored by the user computing entity 30 and/or that have been updated since the content database and/or template database stored by the user computing entity 30 was last updated. The graphics computing entity 275 may then provide the content items, templates, files, and/or the like such that the content database and/or template database is synchronized (e.g., contains the same files and/or the same versions of the same files) as the content database 260 and/or the template database 250 stored by the graphics computing entity 275. For example, the processor 210 may cause the network interface 208 to provide (e.g., transmit) the content items, templates, files, and/or the like required to synchronize the content database and/or template database stored by the user computing entity 30 with the content database 260 and/or the template database 250 stored by the graphics computing entity 275.

In an example embodiment, the content database 260 may comprise a database directory file and/or content records (referred to as content records herein) configured to indicate which content items are the current content items for various content indexes, and/or the like. For example, the content database 260 may comprise two or more publicity photographs for a particular player. The content record corresponding to the particular player may indicate the pathname for the file comprising the current publicity photograph for the particular player (e.g., indexed by the corresponding content index). In another example, a team or sponsor may update its logo. The content database may be updated to include the new logo and a database directory file and/or a corresponding content record (e.g., indexed by the team, sponsor, and/or a content index) may be updated to identify the pathname for the file comprising the new logo such that the user computing entity 30 and/or the graphics computing entity 275 may generate a graphic using the new logo rather than the previous logo.

At block 1306, an indication of user input selecting a graphic context is received. For example, the graphics computing entity 275 may receive an indication of a user-selected graphic context. For example, the user (e.g., operating a user computing entity 30) may provide input (e.g., via the GBI 600) selecting a graphic context from a plurality of user-selectable graphic context options. The user computing entity 30 may provide (e.g., transmit) an indication of the user-selected graphic context. The graphics computing entity 275 may then receive the indication of the user-selected graphic context via the network interface 208, and/or the like.

At block 1308, the style information/data for the graphic may be identified based on the user-selected graphic context. For example, the graphics computing entity 275 may identify the style information/data corresponding to the user-selected graphic context. For example, the processor 210 may processes the received indication of the user-selected graphic context and, responsive thereto, identify the style information/data corresponding to the user-selected graphic context (e.g., via the content database 260, a graphic context database, and/or other data structure storing style information/data). In an example embodiment, the graphic context may correspond to a show (e.g., a television show or series), a sports league, a network, and/or the like. For example, the selected graphic context may corresponds to a show that corresponds to the media production for which the graphic is being generated. For example, the media production may be an episode of the show. A selected graphic context may define style information/data for the corresponding graphic object. For example, the style information/data may define a text font, a logo, background colors, a sponsor, animation effects, and/or the like, of the graphic object. For example, the graphic context may define the style information/data required to make the graphic consistent with the style guide, design, and/or look and feel of the show or other graphic context.

At block 1310, an indication of user input selecting a template is received. For example, the graphics computing entity 275 may receive an indication of a user-selected template. For example, the user (e.g., operating a user computing entity 30) may provide input (e.g., via the GBI 600) selecting a template from a plurality of user-selectable template options. The user computing entity 30 may provide (e.g., transmit) an indication of the user-selected template. The graphics computing entity 275 may then receive the indication of the user-selected template via the network interface 208, and/or the like.

The structure information/data and/or the predetermined and/or predefined set of fields for the graphic may be identified based on the user-selected template. For example, the graphics computing entity 275 may identify the structure information/data and/or predetermined and/or predefined set of fields corresponding to the user-selected template. For example, the processor 210 may processes the received indication of the user-selected template and, responsive thereto, identify the structure information/data and/or predetermined and/or predefined set of fields corresponding to the user-selected template (e.g., via the template database 250 and/or other data structure storing template information/data). In an example embodiment, structure information/data may correspond to a layout and/or dynamic layout of the graphic and/or a layout of one or more content items corresponding to fields of the predetermined and/or predefined set of fields. For example, the structure information/data may indicate where within a graphic a particular content item or text identified by a particular field is to be positioned, the size the particular content item or text, and/or the like. In an example embodiment, the predetermined and/or predefined set of fields corresponding to a template defines the fields available for population for generation of the graphic.

At block 1312, a graphic object is generated. For example, the graphics computing entity 275 may generate a graphic object based on the user-selected graphic context and/or user-selected template. For example, the processor 210 and/or the like may generate a graphic object based on the user-selected graphic context and/or user-selected template. For example, the graphic object may comprise the style information/data identified as corresponding to the user-selected graphic context. For example, the graphic object may comprise the structure information/data identified as corresponding to the user-selected template. For example, the graphic object may comprise the predetermined and/or predefined set of fields (e.g., text fields and/or content fields) identified as corresponding to the user-selected template. In an example embodiment, a graphic object is a data structure that encodes a graphic. For example, the graphic object comprises all of the information/data required to generate the graphic. For example, the graphic object may comprise style information/data, structure information/data, and a set of fields (e.g., text fields and/or content fields) that may be populated with text strings (e.g., text fields) and/or pathnames indicating a file and/or location within the file storing a content item to be included in the graphic.

At block 1314, a graphic preview 652 may be generated and provided. For example, the graphics computing entity 275 may generate a graphic preview 652 based on the graphic object and provide (e.g., transmit) the graphic preview. For example, a processor 210 may generate and/or cause the generation of a graphic preview 652 based on the graphic object. The processor 210 may then cause the network interface 208 to provide the graphic preview. The user computing entity 30 may receive the graphic preview 652 and cause the GBI 600 to provide the graphic preview via the graphic preview area 650, as shown in FIG. 7.

At block 1316, the GBI 600 may be updated based on the graphic object. For example, the graphics computing entity 275 may cause the GBI 600 to be updated based on the predetermined and/or predefined set of fields of the graphics object. For example, the processor 210 may execute the graphics production module 230 to cause the GBI 600 to be updated based on the predetermined and/or predefined set of fields of the graphics object. For example, if the graphics object includes a title text field, the GBI 600 may be updated to include a header section 620 including a title text field 624, such that a user may provide input (e.g., a string of text) defining the title text (e.g., the value of the title text field of the graphic object). In another example, if the graphic object comprises one or more fields corresponding to player publicity photographs, the GBI 600 may be updated to include a corresponding number of fields of content index selectors 634. For example, the content index selector 634 may provide a user with a plurality of user selectable content indexes. In the example embodiment illustrated in FIGS. 6-12, a content index identifies a player. The number of content index selectors 634 (e.g., 634A, 634B) provided by the GBI 600 may be determined based on the predetermined and/or predefined set of fields of the graphic object. In another example, the GBI 600 may be updated to provide a number of statistics and/or other information/data selectors 636 (e.g., 636.1, 636.2). The number of statistics and/or other information/data selectors 636 provided and the/or the selectable options provided via the statistics and/or other information/data selectors 636 may be determined based on the user-selected template and/or the predetermined and/or predefined set of fields of the graphic object. Thus, in an example embodiment, a user may be provided text entry fields and/or selectors (instances of a plurality of selectable options) that correspond to the predetermined and/or predefined set of fields of the graphic object as determined based on the user-selected template.

Continuing with FIG. 13A, at block 1318, an indication of user input providing header text is received. For example, a user may provide header text (e.g., via a hard or soft keyboard that is provided and/or in communication with a user computing entity 30) into a title field 624 and/or a sub title field 626 of the GBI 600. The user computing entity 30 may provide (e.g., transmit) an indication of the header text and/or an indication of the user input providing the header text. The graphics computing entity 275 may receive the header text and/or the indication of the user input providing the header text (e.g., via the network interface 208). Continuing to FIG. 13B, at block 1320, the graphics object may be updated based on the received header text and/or indication user input providing header text. For example, the graphics computing entity 275 may process the received header text and/or indication of the user input providing the header text (e.g., by the processor 210) and, responsive thereto, the graphic object may be updated accordingly. For example, a title field, sub title field, and/or the like of the graphic object may be updated to reflect the user provided header text.

At block 1322, the graphic preview 652 may be updated based on the updated graphic object. For example, the graphic preview 652 may be updated to include the received header text. For example, the processor 210 may cause the graphic preview 652 to be updated to include the received header text and may cause the network interface 208 to provide the updated graphic preview 652 for display GBI 600 (e.g., via the display 116 of the user computing entity 30. For example, FIG. 8 illustrates a view of an example GBI 600 after the user has provided input comprising header text and the graphic preview 652 has been updated and the updated graphic preview 652 provided in the graphic preview area 650 of the GBI 600.

At block 1324 shown in FIG. 13B, an indication of user input selecting one or more content indices. For example, a user computing entity 30 may receive user input selecting one or more content indices via one or more content index selectors 634. The user computing entity 30 may provide (e.g., transmit) an indication of the user-selected content indices. The graphics computing entity 275 may receive the indication of the one or more user-selected content indices (e.g., via the network interface 208). At block 1326, responsive to receiving the indication of the one or more user-selected content indices, the indication of the one or more user-selected content indices may be processed (e.g., via the processor 210) and the corresponding content record may be accessed via the content database 260. For example, a content record may be indexed and/or accessed via a corresponding content index. A content record may comprise one or more pathnames corresponding to various content items corresponding to the content index. For example, the content record corresponding to a first player may comprise a pathname for the first player, background information/data for the first player, a team identifier, a pathname for a team logo, a pathname for a content record corresponding to the team the player plays for, a pathname for a file comprising statistics corresponding to the player, and/or the like.

In an example embodiment, the content record corresponding to the user-selected content index is accessed and/or identified via the content index. In an example embodiment, a content index may be an alphanumeric identifier and/or other identifier configured to uniquely identify a particular set of content. For example, the content identifier may be a player's name or other unique identifier that is used to identify content items corresponding to the player. In another example, a content index may correspond to a sponsor, a team, a series of meetings between two teams, and/or the like. For example, the selectable options may be provided by player name (e.g., Diana Taurasi, Brittney Griner, etc.). Each player may be associated with a content index that uniquely associates that player and the content items associated with that player within the content database 260. Thus, responsive to the user selecting a selectable option from the plurality of selectable options (e.g., list of player names) provided via the content index selector 634, the user computing entity 30 may provide the content index identifying and/or corresponding to the user-selected selectable option such that the graphics computing entity 275 may access the corresponding content record based on the content index corresponding to the user selection.

At block 1328 of FIG. 13B, the graphic object is updated based on the field values and/or pathnames of the accessed content record. For example, the graphics computing entity 275 may update the graphic object based on the field values and/or pathnames of the accessed content record. For example, one or more fields of the graphic object may be filled and/or populated based on the values and/or pathnames stored by corresponding fields of the accessed content record. For example, the user may select a content index corresponding to LeBron James as a first player, as shown in FIG. 9. The content index corresponding to LeBron James may be provided to the graphics computing entity 275. The graphics computing entity 275 may then access the content record indexed by the content index corresponding to LeBron James. The graphic object may comprise a fields for a first player publicity photograph, first player first name, first player last name, and first player team logo. The graphics computing entity 275 may access the content record corresponding to LeBron James, populate the first player publicity photograph with a pathname in a publicity photograph field of the content record, populate the first player first name with the field value of the player first name field of the content record, populate the first player last name with the field value of the player last name field of the content record, populate the first player team logo field with a pathname in a team logo field of the content record, and/or the like. Thus, user selection of a content index may cause the automatic population of a plurality of fields of the graphic object. In an example embodiment, the plurality of fields of the graphic object may be updated with text and/or pathname(s) pointing to a file and/or location within a file comprising a content item to be incorporated into the graphic.

Continuing with block 1330 of FIG. 13B, the graphic preview 652 may be updated based on the updated graphic object. For example, the graphics computing entity 275 may generate an updated graphic preview 652 based on the updated graphic object and provide (e.g., transmit) the updated graphic preview. For example, a processor 210 may generate and/or cause the generation of an updated graphic preview 652 based on the updated graphic object. The processor 210 may then cause the network interface 208 to provide the updated graphic preview. The user computing entity 30 may receive the graphic preview 652 and cause the GBI 600 to provide the updated graphic preview 652 via the graphic preview area 650, as shown in FIG. 9.

Returning to FIG. 13B, at block 1332, an indication of user input selecting a statistic and/or other information/data is received. For example, a user computing entity 30 may receive user input selecting one or more statistics and/or other information/data via one or more statistics and/or other information/data selectors 636. The user computing entity 30 may further receive user input selecting one or more categories via one or more category selectors 632. In an example embodiment, the categories available for selection via the category selector 632 may comprise one or more of background information/data (e.g., position, height, weight, college, previous teams, affiliations, titles and/or awards, and/or the like), season averages, season totals, career averages, career highs, career totals, present game single game statistics, previous single game statistics, and/or the like. In an example embodiment, statistics and/or other information/data (e.g., background information such as position, age, height, weight, college and/or other affiliations, titles and/or awards, and/or the like) available for user selection via the statistic and/or other information/data selectors 636 may be dependent on the media production (e.g., the type or sport and event corresponding to the media production). The user computing entity 30 may provide (e.g., transmit) an indication of the user-selected categories statistics, and/or other information/data. The graphics computing entity 275 may receive the indication of the one or more user-selected categories statistics, and/or other information/data (e.g., via the network interface 208). At block 1334, responsive to receiving the indication of the one or more user-selected categories statistics, and/or other information/data, the indication of the one or more user-selected categories statistics, and/or other information/data may be processed (e.g., via the processor 210) and the corresponding content record may be accessed via the content database 260 and/or used to updated the graphic object. For example, the content record may comprise a pathname indicating a file and/or a location within the file containing user-selected statistic and/or other information/data corresponding to the user-selected category.

Continuing to FIG. 13C, at block 1336, the graphic object is updated based on the identified pathname corresponding to the user-selected statistic and/or other information/data corresponding to the user-selected category. For example, the graphics computing entity 275 may update the graphic object based on the field values and/or pathnames of the accessed content record. For example, one or more fields of the graphic object may be filled and/or populated based on the values and/or pathnames stored by corresponding fields of the accessed content record. For example, the user may select a content index corresponding to LeBron James as a first player, select a category corresponding to career high as the first category, and select a statistic corresponding to highest points in a single game, as shown in FIG. 10. The content record corresponding to the content index corresponding to LeBron James may be used by the graphics computing entity 275 to determine a pathname for a file and/or location within the file containing the career high points in a single game statistic for LeBron James. The graphics computing entity 275 may access the content record corresponding to LeBron James and populate the first player first statistic corresponding to the first category field with the pathname in a career high points in a single game field of the content record, and/or the like. Thus, user selection of a statistic and/or other information/data via a statistic and/or other information/data selector 636 may cause automatic population (e.g., by the processor 210) of a corresponding field within the graphic object for each user-selected content index. In an example embodiment, at least some of the statistics and/or other information/data fields of the graphic object may be populated with a pathname corresponding to a file and/or a location within the file where the corresponding value and/or text string is stored. The file may be updated in real time and/or near real time such that when the graphic is generated, the real time and/or near real time statistics value, text string, and/or the like may be incorporated into the graphic. In an example embodiment, one or more fields of the graphic object may be updated with statistic values, text, and/or pathname(s) pointing to a file and/or location within a file comprising a content item corresponding to the user-selected statistic and/or other information/data of the user-selected category to be incorporated into the graphic.

In an example embodiment, for statistics and/or other information/data that is not likely or will not change during the course of a media production (e.g., during a particular game) or over the course of a sport league season, the graphic object may be updated with the statistics value, text string, and/or the like rather than a pathname in order to reduce the number of pathnames and/or files accessed during the generation, rendering, publishing, and/or the like of the graphic. Thus, example embodiments provide the technical advantage of providing graphics comprising real time and/or near real time accurate statistics and/or other information/data while reducing/minimizing the number of file calls required to generate, render, publish, and/or the like the graphic. For example, a player's height, position, college affiliation, previous season statistics, and/or the like will not and/or are not likely to change over the course of a season. Similarly, previous game statistics, season averages, previous meeting(s) with the same team/opponent statistics, and/or the like will not and/or are not likely to change over the course of the current game. Thus, if a user selects the category previous meeting with same team/opponent and selects the statistic points scored, the graphic object may be updated with the statistics value, in an example embodiment. In another example, if the user selects the category current game statistics and selects the statistic points scored, the graphic object may be updated with a pathname indicating a file and/or a location/field within the file storing a real time and/or near real time accurate value for the number of points scored in the current game for the player of the user-selected content index.

At block 1338, the graphic preview 652 may be updated based on the updated graphic object. For example, the graphics computing entity 275 may generate an updated graphic preview 652 based on the updated graphic object and provide (e.g., transmit) the updated graphic preview. For example, a processor 210 may generate and/or cause the generation of an updated graphic preview 652 based on the updated graphic object. For example, the graphics computing entity 275 may access the content of files and/or locations within files indicated by the pathnames of the fields of the graphic object and generate a graphic preview 652 based thereon. In an example embodiment, the graphic preview 652 may be generated based on the content of files and/or locations within files indicated by the pathnames of the fields of the graphic object, any text strings in one or more fields of the graphic object, the style information/data of the graphic object, and/or the structure information/data of the graphic object. In an example embodiment, the layout provided by the structure information/data provides a dynamic layout. For example, the layout of the graphic may change as the user selects more content indices, categories, statistics, and/or other information/data. For example, the layout of the graphic preview 652 is changed between FIG. 10 and FIG. 11 as the user selects additional statistics. The processor 210 may cause the network interface 208 to provide the updated graphic preview 652. The user computing entity 30 may receive the updated graphic preview 652 and cause the GBI 600 to provide the updated graphic preview 652 via the graphic preview area 650, as shown in FIGS. 10 and 11.

Returning to FIG. 13C, at block 1340, an indication of user input providing footer text is received. For example, a user may provide footer text (e.g., via a hard or soft keyboard that is provided and/or in communication with a user computing entity 30) into a footer text field 642 in the footer section 640 of the GBI 600. The user computing entity 30 may provide (e.g., transmit) an indication of the footer text and/or an indication of the user input providing the footer text. The graphics computing entity 275 may receive the footer text and/or the indication of the user input providing the footer text (e.g., via the network interface 208). At block 1342, the graphics object may be updated based on the received footer text and/or indication of user input providing footer text. For example, the graphics computing entity 275 may process the received footer text and/or indication of the user input providing the footer text (e.g., by the processor 210) and, responsive thereto, the graphic object may be updated accordingly. For example, a footer text field, and/or the like of the graphic object may be updated to reflect the user provided footer text.

At block 1344, the graphic preview 652 may be updated based on the updated graphic object. For example, the graphic preview 652 may be updated to include the received footer text. For example, the processor 210 may cause the graphic preview 652 to be updated to include the received footer text and may cause the network interface 208 to provide the updated graphic preview 652 for display GBI 600 (e.g., via the display 116 of the user computing entity 30). For example, FIG. 12 illustrates a view of an example GBI 600 after the user has provided input comprising footer text and the graphic preview 652 has been updated and the updated graphic preview 652 provided in the graphic preview area 650 of the GBI 600.

As should be understood, the user may select one or more other content indices (e.g., via content indices selectors 634 provided via the GBI 600), one or more other categories (e.g., via category selectors 632 provided via the GBI 600), one or more statistics and/or other information/data (e.g., via statistics and/or other information/data selectors 636), enter and/or edit text (e.g., via a title field, sub title field, footer field, and/or the like), enter, select, and/or edit a trigger (e.g., via a trigger selector 622, and/or the like), and/or make other modifications to the graphic via the GBI 600 in an order of the user's choosing. As should also be understood, some of the processes, procedures, operations, and/or the like described herein as being performed by the graphics computing entity 275 may performed by the user computing entity 30 in various embodiments. For example, in an example embodiment, the user computing entity 30 updates the graphic object (e.g., via processing device 108) and provides (e.g., via the transmitter 104 or the network interface 120) the updated graphic object to the graphics computing entity 275 for generation of the updated graphic preview by the graphics computing entity 275.

Once a user has generated a graphic, the user may choose to publish, render, play and/or the like the graphic live to air (if the media production is live and the user is operating and/or accessing a live play-capable graphics computing entity 275A), export a graphic, or store the graphic by the graphics production module 230, for example. For example, the graphics production module 230, and/or other program, application, and/or module operating on the user computing entity 30 and/or graphics computing entity 275, may store graphics (e.g., the corresponding graphic objects) generated by a user in association with a user profile corresponding to the user. For example, if the user logs out and/or the GBI 600 and/or the user computing entity 30 crashes and/or the like (e.g., battery dies, restart forced by software updated, and/or the like), when the user establishes a new communication session with a graphics computing entity 275, the user may be provided with access to all of the graphics the user had previously generated and/or was in the process of generating. In an example embodiment, each step taken by the user to generate the graphic may be stored such that the generation of the graphic may be played back step-by-step.

Exporting a Graphic as a Still Graphic File

FIG. 14 provides a flowchart illustrating processes, procedures, operations, and/or the like that may be completed by a graphics computing entity 275 and/or a user computing entity 30 in accordance with an example embodiment to export a graphic as a still graphic file. Starting at block 1402, user input is received indicating a user would like to export a graphic as a still graphic file. In an example embodiment, the user may provide input to a user computing entity 30 via a GBI 600 indicating that the user would like to export a graphic as a still graphic file. In an example embodiment, user input may be received indicating the type of still graphic file the user would like to export the graphic as (e.g., JPEG, GIF, bitmap, and/or the like). In an example embodiment, the user computing entity 30 may provide (e.g., transmit) an indication of the user input requesting exportation of the graphic to a still graphic file. The graphics computing entity 275 may receive the indication of the user input requesting exportation of the graphic to a still graphic file (e.g., via network interface 208).

At block 1404, the graphic may be rendered based on the graphic object. For example, the graphics computing entity 275 may render the graphic based on the graphic object. For example, the processor 210 may execute the graphics rendering module 240 to render the graphic. For example, one or more files and/or locations within the file(s) may be accessed based on pathnames stored in one or more fields of the graphic object. Text strings and/or values may be extracted from the one or more files and/or locations within the file(s) identified by the pathnames and the text strings and/or values may be incorporated into the graphic based on the structure information/data relevant to the corresponding fields. One or more images, logos, photographs, diagrams, drawings, and/or other graphic content may be accessed based on the pathnames stored in one or more fields of the graphic object and the corresponding graphic content may be incorporated into the graphic based on the structure information/data relevant to the corresponding fields. Thus, one or more content items and user provided text may be incorporated into the graphic based on the corresponding structure information/data of the graphic object and in accordance with the style information/data of the graphic object.

At block 1406, the still graphic file is generated. For example, the graphics computing entity 275 may store the rendered graphic as a still graphic to a still graphic file. For example, the processor 210 may cause a still graphic file comprising the rendered graphic to be stored to memory 216. At block 1408, the still graphic file is provided. For example, the graphics computing entity 275 may provide (e.g., transmit) the still graphic file. For example, the processor 210 may cause the network interface 208 to provide the still graphic file comprising the rendered graphic. For example, the user computing entity 30 may receive the still graphic file comprising the rendered graphic and store the still graphic file (e.g., in memory 122, 124).

Exporting a Graphic as an Animated Graphic File

FIG. 15 provides a flowchart illustrating processes, procedures, operations, and/or the like that may be completed by a graphics computing entity 275 and/or a user computing entity 30 in accordance with an example embodiment to export a graphic as an animated graphic file. Starting at block 1502, user input is received indicating a user would like to export a graphic as animated graphic file. In an example embodiment, the user may provide input to a user computing entity 30 via a GBI 600 indicating that the user would like to export a graphic as an animated graphic file. In an example embodiment, user input may be received indicating the type of animated graphic file the user would like to export the graphic as (e.g., MP3, GIF, flash, and/or the like). In an example embodiment, the user computing entity 30 may provide (e.g., transmit) an indication of the user input requesting exportation of the graphic to an animated graphic file. The graphics computing entity 275 may receive the indication of the user input requesting exportation of the graphic to an animated graphic file (e.g., via network interface 208).

At block 1504, the graphic may be rendered as an animated graphic based on the graphic object. For example, the graphics computing entity 275 may render the animated graphic based on the graphic object. For example, the processor 210 may execute the graphics rendering module 240 to render the animated graphic. For example, one or more files and/or locations within the file(s) may be accessed based on pathnames stored in one or more fields of the graphic object. Text strings and/or values may be extracted from the one or more files and/or locations within the file(s) identified by the pathnames and the text strings and/or values may be incorporated into the graphic based on the structure information/data relevant to the corresponding fields. One or more images, logos, photographs, diagrams, drawings, and/or other graphic content may be accessed based on the pathnames stored in one or more fields of the graphic object and the corresponding graphic content may be incorporated into the graphic based on the structure information/data relevant to the corresponding fields. Thus, one or more content items and user provided text may be incorporated into the graphic based on the corresponding structure information/data of the graphic object and in accordance with the style information/data of the graphic object. Additionally, one or more animations, animation parameters, and/or the like may be accessed based on the style information/data of the graphic object for animating the animated graphic and/or for rendering the graphic as an animated graphic.

At block 1506, the animated graphic file is generated. For example, the graphics computing entity 275 may store the rendered graphic as an animated graphic to an animated graphic file. For example, the processor 210 may cause an animated graphic file comprising the rendered graphic to be stored to memory 216. At block 1408, the animated graphic file is provided. For example, the graphics computing entity 275 may provide (e.g., transmit) the animated graphic file. For example, the processor 210 may cause the network interface 208 to provide the animated graphic file comprising the rendered animated graphic. For example, the user computing entity 30 may receive the animated graphic file comprising the rendered graphic and store the animated graphic file (e.g., in memory 122, 124).

Exporting One or More Graphics as a Graphic Document

As described above, still and/or animated graphics may be exported to still and/or animated graphics files. However, graphics files tend to be generally large. Moreover, generally, each graphic file only comprises one graphic. Additionally, if a graphic is generated, rendered, and/or the like prior to the beginning of a media production, any statistics and/or other information/data and/or graphic content (e.g., logos, etc.) may not be real time or near real time accurate when the graphic is published and/or played to air during the media production. Thus, a user (e.g., a director) may choose to export graphics the user has generated before the beginning of a media production to a graphic document such that the generated graphics may be easily sent (e.g., emailed) to a graphics operator who can then render the graphics in real time and/or near real time during the media production such that the statistics and/or other information and/or graphic content of the graphic is real time and/or near real time accurate when the graphic is published and/or played to air as part of the media production. Thus, example embodiments provide a technical advantage in allowing a user to generate graphics prior to the beginning of a media event (e.g., a live media event) while still allowing and/or ensuring aspects of the graphic are real time and/or near real time accurate when the graphic is published and/or played to air as part of the media production. A graphics document further provides the advantage that a plurality of graphics may be stored to the same graphics document while still allowing for individual manipulation, editing, rendering, publishing, and/or the like of each of the plurality of graphics. Moreover, the graphics document, even when encoding a plurality of graphics, is a moderately sized file (e.g., a kilobyte scale file).

FIG. 16 provides a flowchart illustrating processes, procedures, operations, and/or the like that may be completed by a graphics computing entity 275 and/or a user computing entity 30 in accordance with an example embodiment to export and/or encode one or more graphics in a graphic document. Starting at block 1602, user input is received indicating a user would like to export and/or encode one or more graphics in a graphic document. In an example embodiment, the user may provide input to a user computing entity 30 via a GBI 600 indicating that the user would like to export and/or encode one or more graphics in a graphic document. In an example embodiment, user input may be received indicating the type of graphic document the user would like to export and/or encode the graphic into (e.g., plain text, word document, and/or the like). In an example embodiment, the user computing entity 30 may provide (e.g., transmit) an indication of the user input requesting exportation and/or encoding of the graphic into a graphic document. The graphics computing entity 275 may receive the indication of the user input requesting exportation and/or encoding of the graphic into a graphic document (e.g., via network interface 208).

At block 1604, the graphics computing entity 275 may encode the one or more graphics into a graphic document. For example, the graphics computing entity 275 may store the graphic object corresponding to the one or more graphics to a text file such as a plan text file, word document, and/or the like. For example, the processor 210 may cause the memory 216 to store a graphic document comprising the graphic objects corresponding to each of the one or more graphics to be exported and/or encoded. In various embodiments, the graphic objects may be in various formats. For example, in one embodiment, the graphic object may be in an xml format. In another example embodiment, the graphic object may be in j son format. In yet another example embodiment, the graphic object may be in an html format. In still another example embodiment, the graphic object may be in a specialized format.

At block 1606, the graphic document may be provided. For example, the graphics computing entity 275 may provide (e.g., transmit) the graphic document. For example, the processor 210 may cause the network interface 208 to provide the graphic document comprising the one or more graphic objects. For example, the user computing entity 30 may receive the graphic document comprising the one or more graphic objects and store the graphic document (e.g., in memory 122, 124). In various embodiments, the user may then email or otherwise provide the graphic document to another user. For example, the user may attach the graphic document (which, for example, is a kilobyte scale file) to an email, SMS message, MMS message, instant messenger message, and/or otherwise transfer the document file to one or more other users. The other users may then import the graphic objects encoded in the graphic document by opening the graphic document through the GBI 600 on an appropriate computing entity (e.g., a user computing entity 30 or a graphics computing entity 275). For example, a user may import one or more graphic objects encoded in a graphic document so that the user may edit, store, render, and/or the like a graphic based on at least one of the one or more graphic objects.

Rendering a Pre-Generated a Graphic Using a Graphic Document

As noted above, a user may encode and/or export one or more graphics into a graphic document. The graphic document may be a plain text file, word document file, ANSII text file, OpenDocument text file, a LaTeX source document, and/or other text file. In an example embodiment, a user may receive a graphic document as an attachment to an email, SMS message, MMS message, instant messenger message, and/or via another file transfer technique and/or protocol. FIG. 17 provides a flowchart illustrating processes, procedures, operations, and/or the like that may be completed by a graphics computing entity 275 and/or a user computing entity 30 in accordance with an example embodiment import and render, publish, and/or the like a pre-generated graphic using a graphic document. Starting at block 1702, user input is received indicating a user would like to open a graphic document via the GBI 600. In an example embodiment, the user may provide input to a user computing entity 30 and/or graphics computing entity 275 (e.g., a live play-capable graphics computing entity 275A) via a GBI 600 indicating that the user would like to open a graphic document. For example, a user may enter a file name of the graphic document via an appropriate entry field of the GBI 600, a corresponding dialogue box or pop-up window, and/or the like. In another example, a user may use an appropriate dialogue box or pop-up window to browse and select the graphic document. In an example embodiment, the graphic document may comprise one or more graphic objects encoding and/or corresponding to one or more pre-generated graphics.

The user-selected graphic document may be imported and read at block 1704. For example, the user computing entity 30 and/or the graphics computing entity 275 may open and/or import and read, parse, and/or the like the graphic object(s) stored in the user-selected graphic document. For example, the processing device 108 and/or the processor 210 may read, parse and/or the like the graphic object(s) stored in the user-selected graphic document.

At block 1706, one or more content items may be accessed based on one or more pathnames stored as field values of one or more fields of a graphic object read, parsed, and/or the like from the graphic document. For example, the user computing entity 30 and/or the graphics computing entity 275 may access one or more content items based on the pathnames stored as field values of one or more fields of a graphic object read, parsed, and/or the like from the graphic document. For example, one or more graphic content items (e.g., photographs, images, diagrams, logos, drawings, and/or the like) and/or one or more non-graphic content items (e.g., statistics, background information/data, and/or the like) may be accessed from one or more files stored in the content database 260 based on the pathnames stored as field values of the graphic object. For example, a graphic object may comprise a first player publicity photograph field and the field value of the first player publicity photograph field may be a pathname identifying a file comprising the publicity photograph for the first player. In another example, a graphic object may comprise a first statistic field and the field value of the first statistic field may be (a) a statistic value or (b) a pathname identifying a file and/or a location within the file where the corresponding statistic is stored. Thus, based on the pathnames provided as field values for one or more fields of the graphic object read, parsed, and/or the like from the graphic document, one or more content items (e.g., graphic content items and/or non-graphic content items) from one or more files stored in the content database 260. For example, the processing device 108 and/or the processor 210 may access one or more content items based on pathnames provided as field value of one or more fields of a graphic object imported and/or read from the graphic document.

At block 1708, one or more graphic content items of the pre-generated graphic may be checked against a corresponding current graphic content item. In an example embodiment, the one or more graphic content items may be logos, publicity photographs, and/or the like. For example, a graphics computing entity 275 (e.g., via processor 210) and/or a user computing entity 30 (e.g., processing device 108) may check one or more graphic content items of the pre-generated graphic against a corresponding current graphic content item. For example, a content record corresponding to a content index (e.g., player) to determine, identify, and/or the like a current logo for the player's team. In another example, a content record corresponding to a sponsor identified via a sponsor index stored in a sponsor field of the graphic object may be accessed to determine, identify, and/or the like a current logo for the sponsor. In the example of the logo, the logo referenced via the pathname stored in the graphic object may be checked against the current logo to determine if the logos are the same or if the logo has been updated since the pre-generated graphic was originally generated.

Various techniques may be used to determine if the current logo (or other graphic content item) is the same as or different from the logo identified by the pathname stored in the logo field (or other graphic content field) of the graphic object, in various embodiments. In an example embodiment, the logo identified by the pathname stored in the graphic object may be compared to the current logo pixel by pixel. In another example embodiment, a raw color value (RGB, cmyk, or other color value) of one or more pixels of the logo stored in the file identified by the pathname stored as a field value in the graphic object may be stored as part of the graphic object. Thus, in an example embodiment, comparing and/or checking the logo referenced and/or indicated by the pathname stored in the graphic object may be compared to the current logo without opening and/or accessing the file identified by the pathname. The raw color values for the one or more pixels may be compared and/or checked against the corresponding pixels of the current logo to determine if the current logo is the same as the logo referenced and/or identified via the pathname or if the current logo is a new logo. For example, a graphic object may comprise a sponsor logo field and sponsor logo color fields. The field value of the sponsor logo field may be a pathname identifying a file comprising the logo image. The sponsor logo color fields may comprise raw color values for specified pixels of the logo image. The current logo may be accessed based on the content record corresponding to the sponsor. For example, the content record corresponding to the sponsor may be indexed by a content index corresponding to the sponsor and stored in a sponsor identifier field of the graphic object corresponding to the pre-generated graphic. In another example, the content record may indicate a sponsor and corresponding sponsor logo (e.g., the pathname for the file storing the sponsor logo) based on the user-selected graphic context of the pre-generated graphic. The raw color values of the specified pixels of the logo image may be compared to the raw color values of the corresponding pixels of the current logo. It may be determined, based on the raw color value comparison, in an example embodiment, if the logo identified by the pathname stored in the graphic object is the same as the current logo. For example, if the current graphic content item does not match the graphic content item identified by the pathname stored in the graphic object, the graphic content item identified by the pathname stored in the graphic object is outdated. In an example embodiment, a graphic content item may be check against a current graphic content item via a comparison of pathnames identifying the file(s) storing the graphic content item and the current graphic content item. In an example embodiment, a graphic content item may be check against a current graphic content item via a comparison of one or more elements of meta data (e.g., date generated, date modified, date added to content database, file size, and/or the like) corresponding to the graphic content item and the current graphic content item.

At block 1710, for any graphic content items identified as outdated, the pathname in the graphic object corresponding to the outdated graphic content item is updated to the pathname of the current graphic content item. For example, the pathname for the current graphic content item may be identified from an appropriate field of the corresponding content record. For example, if a graphic object has the pathname "sponsorlogo1.jpg" as the field value of a sponsor logo field, and it is determined that the logo image stored as sponsorlogo1.jpg is not the same as the current sponsor logo stored as sponsorlogo2.jpg, the field value of the sponsor logo field may be updated to the current logo pathname "sponsorlogo2.jpg." In an example embodiment, the pathname may updated in the active memory corresponding to the GBI 600, graphic production module 230, and/or graphics rendering module 240. In an example embodiment, the pathname may be updated in both the active memory corresponding to the GBI 600, graphic production module 230, and/or graphics rendering module 240 and the graphic document. For example, the graphics computing entity 275 and/or the user computing entity 30 may update the pathname of any outdated graphic content items to the pathname identifying the corresponding current graphic content item. For example, the processor 210 may update a graphic object stored in memory 216 to replace the pathname of any outdated graphic content items with the pathname identifying the corresponding current graphic content item. For example, a graphic field corresponding to an outdated graphic content item may be updated to a field value that is the pathname of the corresponding current graphic content item. Similarly, the processing device 107 may update a graphic object stored in memory 122, 124 to replace the pathname of any outdated elements with the pathname identifying the corresponding current element.

At block 1712, the graphic is rendered, published, and/or the like. For example, the graphics computing entity 275 may render, publish, and/or the like the pre-generated graphic based on the graphic object. For example, the processor 210 may execute the graphics rendering module 240 to render the pre-generated graphic. For example, one or more files and/or locations within the file(s) may be accessed based on pathnames stored in one or more fields of the graphic object. Text strings and/or values may be extracted from the one or more files and/or locations within the file(s) identified by the pathnames and the text strings and/or values may be incorporated into the graphic based on the structure information/data relevant to the corresponding fields. One or more images, logos, photographs, diagrams, drawings, and/or other graphic content may be accessed based on the pathnames stored in one or more fields of the graphic object and the corresponding graphic content may be incorporated into the graphic based on the structure information/data relevant to the corresponding fields. Thus, one or more content items and user provided text may be incorporated into the graphic based on the corresponding structure information/data of the graphic object and in accordance with the style information/data of the graphic object. The graphic may then be played and/or published live to air, provided (e.g., displayed) via a user interface (e.g., the graphic preview area 650 of GBI 600), and/or the like.

As described above, one or more graphic content items (e.g., logos, publicity photographs, and/or other graphic content items) that are referenced by the graphic object stored in the graphic document may be checked to ensure that when the pre-generated graphic is rendered, published and/or the like (e.g., at some time after the graphic was originally generated), the pre-generated graphic is rendered, published, and/or the like with the current graphic content item. Similarly, various field values for non-graphic content items are determined based on a pathname indicating a file and/or location within the file storing a real time or near real time accurate value and/or text string for the intended non-graphic content. For example, a graphic may be generated prior to the production of a media event and the graphic may be rendered for publishing and/or playing to air with real time and/or near real time accurate graphic and non-graphic content items. For example, a graphic to be published live to air during the last game of the season may be generated before the season starts and still be published to air during the last game of the season with real time and/or near real time accurate statistics, sponsor logos, team logos, player publicity photographs, and/or the like. Thus, example embodiments provide a technical improvement to the field of publishing and/or playing graphics to air as part of a media production by allowing for pre-generation of graphics that may be published and/or played live to air with real time and/or near real time accurate content items.

Updating a Content Database

FIG. 18 provides a flowchart illustrating processes, procedures, operations, and/or the like for updating a content database 260. For example, a content database 260 may comprise a plurality of files storing various graphical content items (e.g., logos, publicity photographs, images, diagrams, drawings, captures of social media posts, and/or the like). For example, a content database 260 may comprise one or more files storing various non-graphic content items (e.g., statistics, background information/data, schedule information/data, and/or the like). For example, the content database 260 may comprise content records (and/or a directory listing) identifying the current graphical content items corresponding to a content index and identifying the files and/or locations within the files storing various non-graphic content items corresponding to the content index. In an example embodiment, when a new graphic content item corresponding to a content index is added to the content database 260, the corresponding content record may be updated to identify the new graphic content item as a current graphic content item for a particular content index. For example, if a new publicity photograph of LeBron James is added to the content database 260, the content record corresponding to LeBron James may be updated such that the publicity photograph field of the content record comprises the pathname for the new publicity photograph.

Starting at block 1802, user input is received selecting a content record. For example, a user computing entity 30 may receive user input (e.g., via GBI 600) selecting a content record. In an example embodiment, the content record may be identified by a user typing a content index, the user selecting a content index, a user typing and/or selecting a player name, and/or the like. For example, the user may have stored a new publicity photograph, logo, or other graphic content item to the content database 260 and need to update the corresponding content record.

At block 1804, the user-selected content record is accessed. For example, the user computing entity 30 may access the user-selected content record. For example, the processing device 108 may access the user-selected content record from the content database 260. At block 1806, the user-selected content record and/or a portion thereof may be provided (e.g., displayed via display 116) via a content record update interface that may be provided via the GBI 600.

At block 1808, user input providing update information/data may be received. For example, a user computing entity 30 may receive user input providing update information/data. For example, the update information/data may comprise a field identifier and a pathname. For example, if the user has added a new publicity photograph for LeBron James, then the update information/data may comprise a field identifier identifying the publicity photograph field of the content record corresponding to LeBron James and a pathname for the file comprising the new publicity photograph.

At block 1810, the user-selected content record is updated based on the update information/data. For example, the user computing entity 30 may update the user-selected content record based on the update information/data. For example, the processing devices 108 may update the field identified by the field identifier with the pathname provided by the update information/data. At block 1812, the content databases 260 stored on various user computing entities 30 and/or graphic computing entities 275 may be synchronized. For example, as described above, when a communication session is established between a user computing entity 30 and a graphics computing entity 275, the content database stored on the user computing entity 30 and the content database 260 stored on the graphics computing entity 275 may be synchronized. In an example embodiment, if a file and/or content record of a content database stored by a user computing entity 30 and the corresponding file and/or content record of the content database 260 stored by the graphics computing entity 275 do not agree, are not the same, and/or the like, the file and/or content record that was updated most recently may be determined to be the correct file and/or content record. Thus, a change and/or update made to a graphic content database stored by a user computing entity 30 or a content database 260 stored by a graphics computing entity 275 may be propagated throughout the content databases stored by each of the graphic computing entities 275 and/or user computing entities 30 of the system.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for rendering a graphic to be overlaid on a portion of a media production based at least in part on a pre-generated graphic, the method comprising:

reading, via a second computing entity, a graphic object from a graphic document comprising the graphic object, wherein (a) the graphic object is a text-encoding of the pre-generated graphic, (b) the graphic object comprises (i) structure information, (ii) a field populated with a pathname corresponding to a content item of the pre-generated graphic, and (iii) a first pixel attribute corresponding to a pixel of the content item, (c) the graphic object was generated by a first computing entity and the pathname references the content item stored in a first database that is local to the first computing entity, and (d) the content item is stored in the first database prior to a providing of a stream or broadcast of the media production;

analyzing, by the second computing entity, a second pixel attribute of a pixel of a particular content item based at least in part on the first pixel attribute read from the graphic object to determine whether the content item has been updated since the pre-generated graphic was built, wherein the particular content item is stored in a second database that is local to the second computing entity and the particular content item is accessed from the second database based at least in part on a pathname (a) read from the graphic object and (b) corresponding to the content item;

in response to determining that the content item has been updated since the pre-generated graphic was built;
identifying, by the second computing entity, a current pathname indicating a second file in which the particular content item is stored in the second database stored locally by the second computing entity; and
updating, by the second computing entity, the graphic object to (a) remove the pathname corresponding to the content item, and (b) include the current pathname in a field from which the pathname corresponding to the content item was removed;

accessing, by the second computing entity and using the current pathname read from the graphic object, the particular content item from the second database;

rendering, by the second computing entity, a graphic comprising the particular content item accessed from the second database, the particular content item positioned within the graphic based on the field comprising the current pathname and the structure information; and causing, by the second computing entity, display of the graphic via a user interface.

2. The method of claim 1, further comprising playing the graphic to air as part of the media production.

3. The method of claim 2, wherein the media production is a live media production.

4. The method of claim 1, wherein the current pathname is determined based at least in part on a content record corresponding to first content index associated with the first content item, the method further comprising updating the graphic object to replace the first pathname with the current pathname, wherein the graphic is rendered using the current content item.

5. The method of claim 4, wherein:
the graphic object comprises a raw color value for the one or more pixels of the first content item, and
determining that the first content item has been updated since the pre-generated graphic was generated comprises:
identifying at least one current raw color value for one or more corresponding pixels of the current version of the content item;
determining whether the raw color values for the one or more pixels of the content item match the at least one corresponding current raw color value from the one or more corresponding pixels of the current version of the content item;
responsive to determining that the raw color values and the at least one current raw color value match, determining that the first content item has not been updated; and
responsive to determining that the raw color values and the at least on current raw color value do not match, determining that the first content item has been updated.

6. The method of claim 1, wherein the graphic document is a text file.

7. The method of claim 1, wherein the graphic object further comprises style information.

8. An apparatus for rendering a graphic to be overlaid on a portion of a media production based at least in part on a pre-generated graphic, the apparatus comprising at least one processor, a network interface configured to communicate via at least one network, and a memory storing computer-executable code portions and a content database, the computer-executable code portions configured to, when executed by the at least one processor, cause the apparatus to at least:
read a graphic object from a graphic document comprising the graphic object, wherein (a) the graphic object is a text encoding the pre-generated graphic, (b) the graphic object comprises (i) structure information, (ii) a field populated with a pathname corresponding to a content item of the pre-generated graphic, and (iii) a first pixel attribute corresponding to a pixel of the content item, (c) the graphic object was generated by a first computing entity and the pathname references the content item stored in a first database that is local to the first computing entity, and (d) the content item is stored in the first database prior to a providing of a stream or broadcast of the media production;
analyze a second pixel attribute of a pixel of a particular content item based at least in part on the first pixel attribute read from the graphic object to determine whether the content item has been updated since the pre-generated graphic was built, wherein the particular content item is stored in a second database that is local to the second computing entity and the particular content item is accessed from the second database based at least in part on a pathname (a) read from the graphic object and (b) corresponding to the content item;
in response to determining that the content item has been updated since the pre-generated graphic was built:
identify a current pathname indicating a second file in which the particular content item is stored in the second database stored locally by the apparatus; and
update the graphic object to (a) remove the pathname corresponding to the content item, and (b) include the current pathname in a field from which the pathname corresponding to the content item was removed;
access the particular content item from the second content database using the current pathname read from the graphic object;
render a graphic comprising the particular content item accessed from the second database, the particular content item positioned within the graphic based on the field comprising the current pathname and the structure information; and
cause display of the graphic via a user interface.

9. The apparatus of claim 8, wherein the computer-executable code portions are further configured to, when executed by the at least one processor, configured to cause the apparatus to at least play the graphic to air as part of the media production.

10. The apparatus of claim 9, wherein the media production is a live media production.

11. The apparatus of claim 8, wherein the current pathname is determined based at least in part on a content record corresponding to first content index associated with the first content item and the computer-executable code portions are further configured to, when executed by the at least one processor, configured to cause the apparatus to at least
update the graphic object to replace the first pathname with the current pathname, wherein the graphic is rendered using the current content item.

12. The apparatus of claim 11, wherein:
the graphic object comprises a raw color value for one or more pixels of the first content item, and
determining whether the first content item has been updated since the pre-generated graphic was generated comprises:
identifying at least one current raw color value for one or more corresponding pixels of the current version of the content item;
determining whether the raw color values for the one or more pixels of the content item match the at least one corresponding current raw color value from the one or more corresponding pixels of the current version of the content item;
responsive to determining that the raw color values and the at least one current raw color value match, determining that the first content item has not been updated; and
responsive to determining that the raw color values and the at least on current raw color value do not match, determining that the first content item has been updated.

13. The apparatus of claim 8, wherein the graphic document is a text file.

14. The apparatus of claim 8, wherein the graphic object further comprises style information.

15. A computer program product for rendering a graphic to be overlaid on a portion of a media production based at least in part on a pre-generated graphic, the computer program product comprising at least one non-transitory computer-readable storage medium having computer-executable program code instructions stored therein, the computer-executable program code instructions comprising program code instructions configured to cause a second computing entity to:
read a graphic object from a graphic document comprising the graphic object, wherein (a) the graphic object is a text encoding the pre-generated graphic, (b) the graphic object comprises (i) structure information, (ii)

a field populated with a pathname corresponding to a content item of the pre-generated graphic, and (iii) a first pixel attribute corresponding to a pixel of the content item, (c) the graphic object was generated by a first computing entity and the pathname references the content item stored in a first database that is local to the first computing entity, and (d) the content item is stored in the first database prior to a providing of a stream or broadcast of the media production;

analyze a second pixel attribute of a pixel of a particular content item based at least in part on the first pixel attribute read from the graphic object to determine whether the content item has been updated since the pre-generated graphic was built, wherein the particular content item is stored in a second database that is local to the second computing entity and the particular content item is accessed from the second database based at least in part on a pathname (a) read from the graphic object and (b) corresponding to the content item;

in response to determining that the content item has been updated since the pre-generated graphic was built:
identify a current pathname indicating a second file in which the particular content item is stored in the second database stored locally by the apparatus; and
update the graphic object to (a) remove the pathname corresponding to the content item, and (b) include the current pathname in a field from which the pathname corresponding to the content item was removed;

access the particular content item from the second content database using the current pathname read from the graphic object;

render a graphic comprising the particular content item accessed from the second database, the particular content item positioned within the graphic based on the field comprising the current pathname and the structure information; and cause display of the graphic via a user interface.

16. The computer program product of claim 15, the computer-executable program code instructions further comprise program code instructions configured to play the graphic to air as part of the media production.

17. The computer program product of claim 16, wherein the media production is a live media production.

18. The computer program product of claim 15, wherein the current pathname is determined based at least in part on a content record corresponding to first content index associated with the first content item and the computer-executable program code instructions further comprise program code instructions configured to
update the graphic object to replace the first pathname with the current pathname, wherein the graphic is rendered using the current content item.

19. The computer program product of claim 18, wherein:
the graphic object comprises a raw color value for one or more pixels of the first content item, and
determining whether the first content item has been updated since the pre-generated graphic was generated comprises:
identifying at least one current raw color value for one or more corresponding pixels of the current version of the content item;
determining whether the raw color values for the one or more pixels of the content item match the at least one corresponding current raw color value from the one or more corresponding pixels of the current version of the content item;
responsive to determining that the raw color values and the at least one current raw color value match, determining that the first content item has not been updated; and
responsive to determining that the raw color values and the at least on current raw color value do not match, determining that the first content item has been updated.

20. The computer program product of claim 15, wherein the graphic document is a text file.

* * * * *